(12) United States Patent
Franz

(10) Patent No.: US 12,342,763 B2
(45) Date of Patent: Jul. 1, 2025

(54) MODULAR ULTRA LOW DRAG SUB-SURFACE MEMBRANE INSTALLATION APPARATUS, MACHINE, AND METHODS WITH VARIOUS AUTOMATED AND SEMI-AUTOMATED SUB-SYSTEMS INCLUDING SUB-SURFACE DRIP TAPE INSTALLATION

(71) Applicant: TERRA NOVA RESEARCH, INC., Saline, MI (US)

(72) Inventor: James K. Franz, Saline, MI (US)

(73) Assignee: TERRA NOVA RESEARCH, INC., Saline, MI (US)

( * ) Notice: Subject to any disclaimer, the term of this patent is extended or adjusted under 35 U.S.C. 154(b) by 988 days.

(21) Appl. No.: 17/445,364

(22) Filed: Aug. 18, 2021

(65) Prior Publication Data
US 2022/0053711 A1 Feb. 24, 2022

Related U.S. Application Data

(60) Provisional application No. 63/202,296, filed on Jun. 4, 2021, provisional application No. 63/149,525, filed
(Continued)

(51) Int. Cl.
*A01G 13/37* (2025.01)
*E02B 3/12* (2006.01)
*E02F 5/10* (2006.01)

(52) U.S. Cl.
CPC .............. *A01G 13/37* (2025.01); *E02B 3/121* (2013.01); *E02F 5/101* (2013.01); *E02F 5/102* (2013.01)

(58) Field of Classification Search
CPC .... A01G 2025/003; E02F 5/101; E02F 5/102; E02F 5/106
See application file for complete search history.

(56) References Cited

U.S. PATENT DOCUMENTS

| 3,298,183 A | 1/1967 | Grether et al. |
| 3,339,369 A * | 9/1967 | Ryan .................. H02G 1/06 405/176 |

(Continued)

FOREIGN PATENT DOCUMENTS

| CA | 2581536 A1 * | 9/2008 | ............. A01G 25/00 |
| CN | 87200217 | 12/1987 | |

(Continued)

OTHER PUBLICATIONS

Manufacture and Performance Evaluation of Machine to Extend Plastic Films Under Soil Surface to Improve Water Retention Balouza-North Sinai, Adil Abdelsamia Meselhy, International Journal of Applied Agricultural Sciences, vol. 6, No. 5, 2020, pp. 148-161.

(Continued)

*Primary Examiner* — Kyle Armstrong
(74) *Attorney, Agent, or Firm* — PIERSON FERDINAND LLP; Keats Quinalty

(57) ABSTRACT

A sub-surface membrane deposition device including a movable frame, at least one chisel attached to the frame, hydraulics to raise and lower the at least one chisel from the frame, and a membrane deployable to a sub-surface level by the at least one chisel as the movable frame is moved. Also provided is a method of deposing a membrane to a sub-surface level that includes providing a movable frame, at least one chisel attached to the frame, hydraulics to raise and lower the at least one chisel from the frame, and a membrane. The method including lowering the at least one chisel with the hydraulics to the sub-surface level, moving the frame and at least one chisel forward, and deploying the membrane to the sub-surface level with the at least one chisel.

20 Claims, 22 Drawing Sheets

Related U.S. Application Data on Feb. 15, 2021, provisional application No. 63/066,979, filed on Aug. 18, 2020.

(56) References Cited

U.S. PATENT DOCUMENTS

| | | | |
|---|---|---|---|
| 3,590,588 | A | 7/1971 | Draper et al. |
| 4,047,387 | A | 9/1977 | Tamura et al. |
| 4,379,655 | A | 4/1983 | Brost et al. |
| 4,705,427 | A | 11/1987 | Atkins et al. |
| 4,838,734 | A | 6/1989 | Pinto |
| 5,165,351 | A * | 11/1992 | Billings .............. A01C 7/048 111/900 |
| 6,764,039 | B1 | 7/2004 | James, Jr. |
| 8,784,007 | B2 * | 7/2014 | Wilson ............... B09B 1/004 405/129.95 |
| 9,615,518 | B2 | 4/2017 | Smucker |
| 10,561,082 | B2 | 2/2020 | Smucker |
| 2013/0164085 | A1 | 6/2013 | Sobrinho |

FOREIGN PATENT DOCUMENTS

| | | |
|---|---|---|
| CN | 1121765 | 5/1996 |
| CN | 2745333 | 12/2005 |
| CN | 201004774 | 1/2008 |
| CN | 201323745 | 10/2009 |
| CN | 201388375 | 2/2010 |
| CN | 201393370 | 2/2010 |
| KR | 200335300 | 7/2003 |

OTHER PUBLICATIONS

A new soil water retention technology for irrigated highly permeable soils, Paper No. 152147252, Miller et al., Nov. 2015.

The Role of Subsurface Water Retention Technology (SWRT) for Growing Chili Pepper in Iraqi Sandy Soils, Shatha Salim AL-Rawi, et al., Journal of Environment and Earth Science, ISSN 2224-3216 (Paper) ISSN 2225-0948 (Online), vol. 7, No. 1, 2017.

* cited by examiner

MODULAR ULTRA LOW DRAG SUB-SURFACE MEMBRANE INSTALLATION APPARATUS, MACHINE, AND METHODS WITH VARIOUS AUTOMATED AND SEMI-AUTOMATED SUB-SYSTEMS INCLUDING SUB-SURFACE DRIP TAPE INSTALLATION

CROSS-REFERENCE TO RELATED APPLICATIONS

The present application claims the benefit of U.S. Provisional Patent Application No. 63/066,979, filed Aug. 18, 2020, U.S. Provisional Patent Application No. 63/149,525, filed Feb. 15, 2021, and U.S. Provisional Patent Application No. 63/202,296, filed Jun. 4, 2021, the entire contents of each of which are incorporated herein by reference.

FIELD

The present disclosure relates to the deposition of sub-surface water retention barriers, e.g. on highly permeable, sandy agricultural soils that are topographically flat or having a slope of no more than 2% rise or fall across the property. More particularly, the disclosure relates to components with narrow profile generating low drag forces and minimal required pulling forces that contain numerous additional augmentations including, for example, allowing for modular machine expansion, integrated chisel and material handling tools and devices, error-proof material handling and deposition, membrane forming methods, constant tensioning of the membrane, semi-automatic membrane perforation for high-speed installation, quick-disconnect shaft designs, quick-changeover membrane roll holders, a shaft-locking mechanism, automated start/stop membrane deposition functions, membrane roll joining devices, devices for utilizing 100% recycled high-blocking, sticky material, simultaneous sub-surface drip tape installation capabilities, and/or precision soil handling through novel sacrificial breaker bars and soil finishing attachments.

BACKGROUND

Agricultural operations on highly permeable, sandy soils present challenges to the global grower community. Increasing variation in rainfall frequency and duration exacerbate this issue regardless of crop type. The low moisture-holding capacity of these soils, currently estimated at 5 billion acres worldwide, prevents the maximization of crop and fiber yields, often jeopardizing the viability of the operation, creating local economic hardships, and eventual negative impacts to the global supply chains of food and fibers. Compounding these problems is the issue of a reliable source of water for the crops, either from rainfall or by irrigation. Rainfall patterns have, over time, become more variable, with more drought events occurring globally with increasing frequency. As a result of reduced rainfall, sources of surface and ground water are being increasingly called upon to make up the shortfall, driving water table levels lower every crop year. Current irrigation methods, some dating back millennia, are also exacerbating the water supply problem, as much of the water for irrigation is lost to evaporation before it can be put to use by the plant.

Within the last decade, small, research-scale plots have experimented with sub-surface water retaining membrane systems installed to intercept the majority of vertical water flow through highly permeable soils. This membrane system holds the water, nutrient, and oxygen at levels necessary to exploit the full genomic potential of the seeds that are planted, demonstrating yield increases from 25% to 504%, depending on cultivar.

However, conventional attempts at installation mechanisms have numerous safety and efficiency drawbacks and the small handful of field trials have proven them to be non-functional beyond the first few feet of installation. While these restrictions are not an issue for research plot sizes used in the studies, which are often measured in $\frac{1}{100}$ths of an acre, the currently existing designs and few pieces of operable equipment are clearly inadequate to address the billions of acres globally that could benefit from the installation of these water-retaining membrane and irrigation systems.

Another drawback to existing devices is that they require a tremendous amount of horsepower to pull through a grower's field. The cross-section of a conventional design is such that in some areas, the width of the device exceeds the width of the membrane being installed. For example, to install a membrane that is 12 inches in width, some individual membrane installation devices exceed 13 inches in width. The design of these conventional devices also utilizes a flat front, normal or perpendicular to the direction of motion through the field, ensuring that maximal surface area is engaging the soils, maximizing drag and horsepower required to function, through which it is being pulled, severely limiting the machine's effectiveness.

Conventional devices have layouts and frame sizes that make day-to-day operations difficult and dangerous, as field-support crew are required to crawl under the multi-ton device, while in operation, to cut the membrane at the exit of the installation device after each run down the field; potentially putting themselves in harm's way hundreds of times per day. The width and length of conventional devices require partial or complete disassembly prior to relocation and further requiring special transport permits for each relocation. All of these hazards and drawbacks together make conventional devices and methods of use unsafe, unreliable, slow, and expensive to the grower to adopt and will preclude the successful commercialization and rapid deployment of this revolutionary sandy-soil agricultural and irrigation technology.

SUMMARY

The present disclosure comprises a novel membrane installation device generally including, in at least one exemplary embodiment in FIG. 1, at least four integrated chisel devices (7,8) that are adjustable, e.g. via hydraulics (10,14), for installation and general movement purposes. The integrated chisel device also contains novel features that address soil drag/resistance (15, 16, 32), precision membrane handling (36, 38, 39, 40), machine stability, operator/pilot safety, continuous membrane resistance (24), membrane quick changeover (36), automated start and stop of the device, and several integrated soil-handling details to ensure high-quality installation of the sub-surface membrane system. The present disclosure is also designed to readily add modular integrated chisel devices to improve efficiency and still be trailered in compliance with all United States Department of Transportation and non-United States regulations.

BRIEF DESCRIPTION OF THE DRAWINGS

Embodiments of the present disclosure are illustrated as an example and are not limited by the figures of the accompanying drawings, in which like references may indicate similar elements and in which.

DETAILED DESCRIPTION

The terminology used herein is for the purpose of describing particular embodiments only and is not intended to be limiting in any manner. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments detailed here within, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Devices for the high-speed, error-proof deposition of sub-surface water retention membrane systems are discussed herein. In the following description, for purposes of explanation, numerous specific details and situations are set forth in order to provide a thorough understanding of the present design. It will be evident, however, to one skilled in the art that the present embodiments detailed here within may be practiced without these specific details.

The present disclosure is to be considered as an exemplification of the embodiments detailed here within and is not intended to limit the embodiments detailed here within to the specific embodiments illustrated by the figures above or description below.

Figure 1:
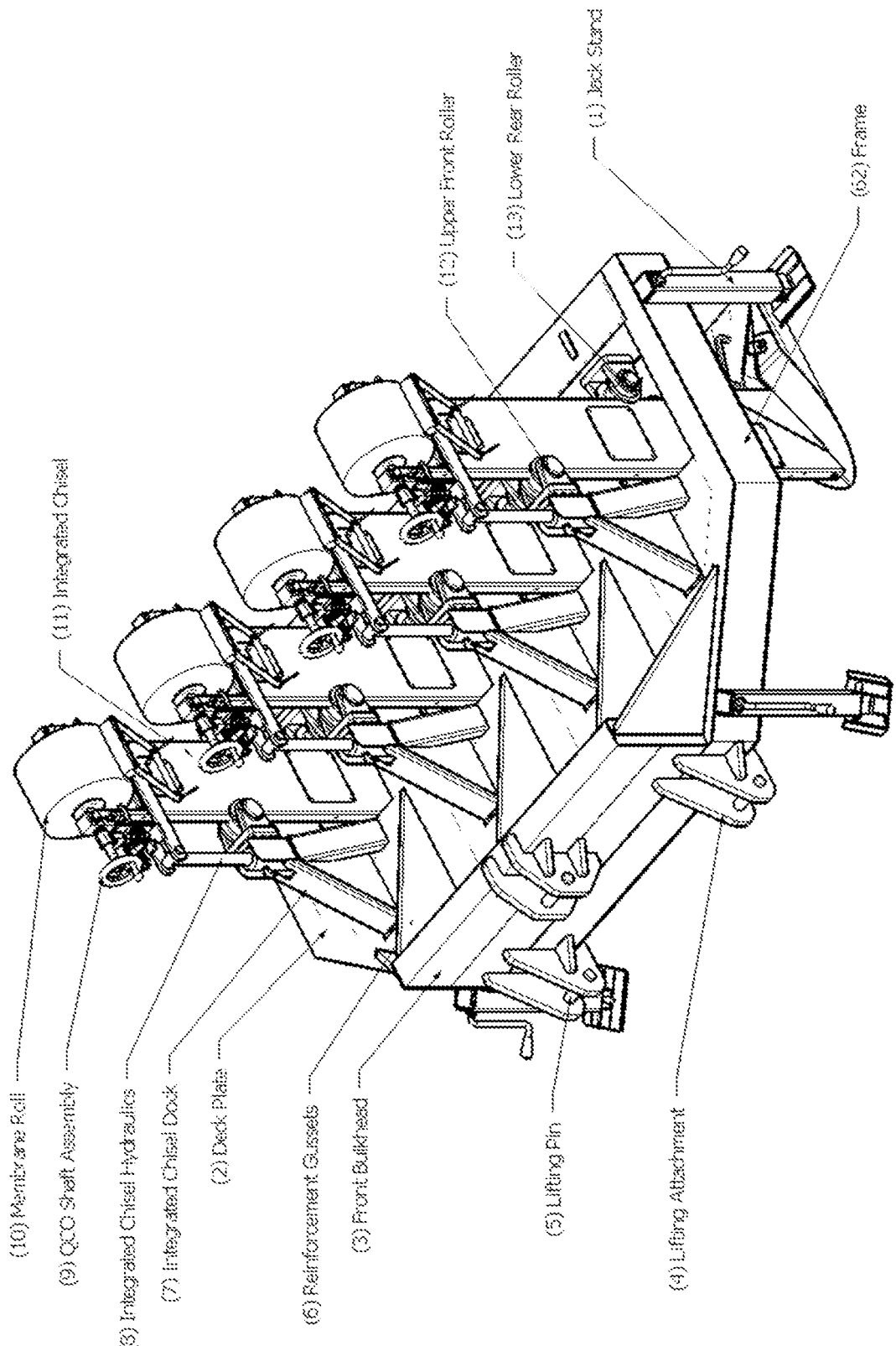
FIG. 1 depicts an isometric view of an exemplary device according to a first embodiment.
Figure 2:
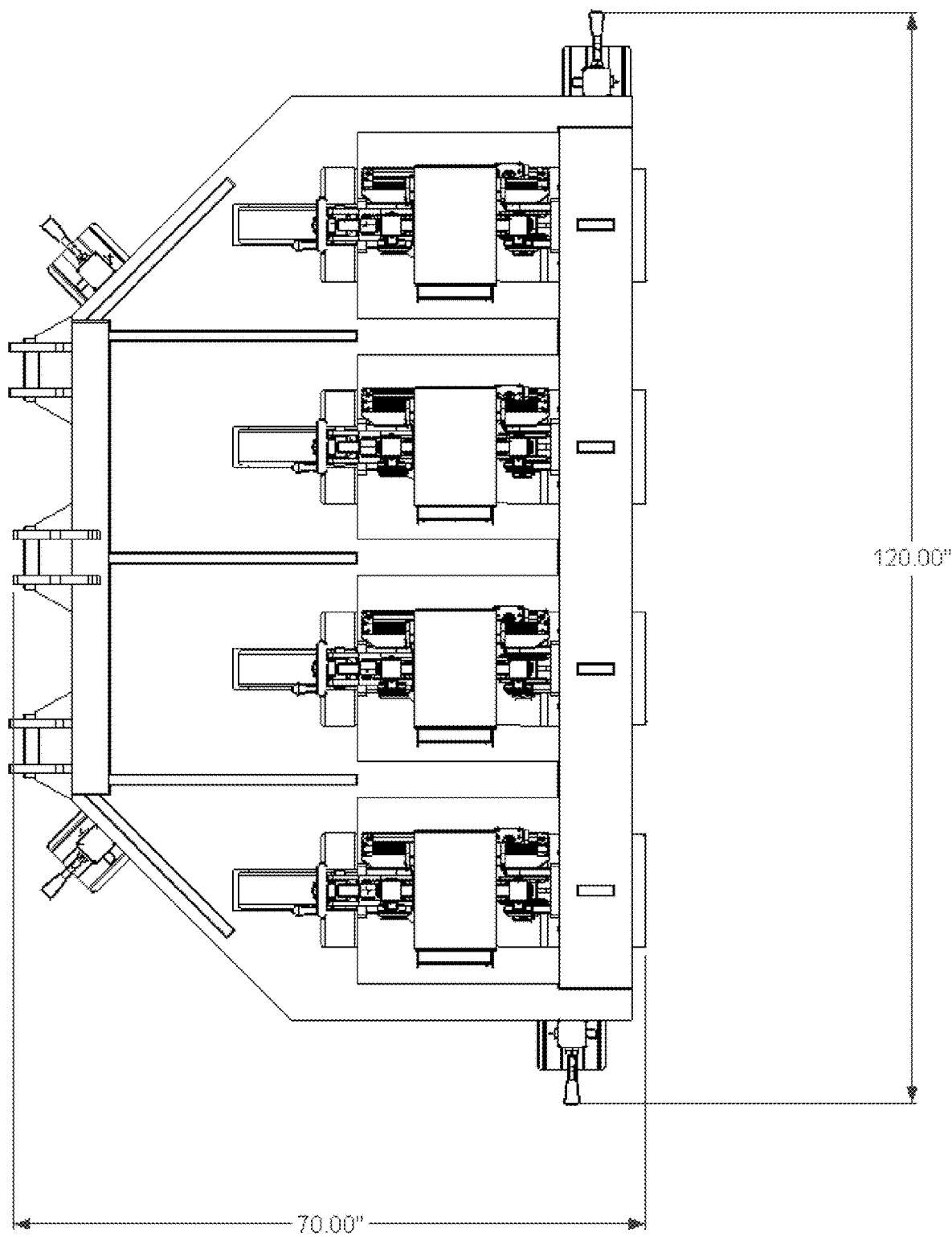
FIG. 2 is a top view of frame and chassis components of the device shown in FIG. 1.
Figure 3:
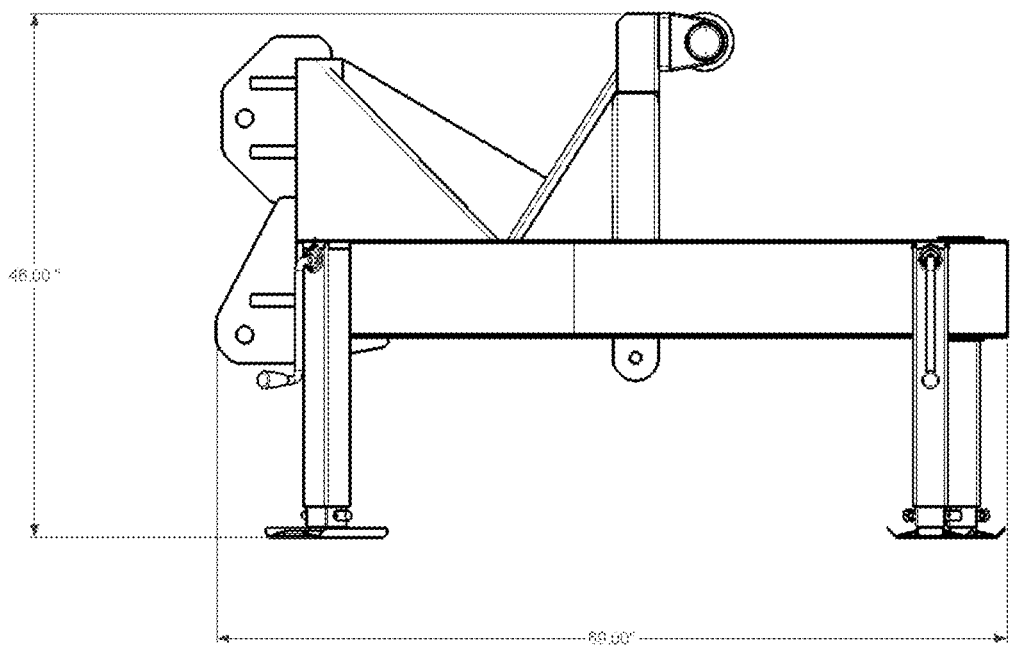
FIG. 3 is a side view of frame and chassis components of the device shown in FIG. 1.

The present embodiments detailed here within will now be described by referencing the figures representing preferred embodiments. FIG. 1 depicts an isometric view of the elements that may comprise the sub-surface membrane deposition device according to various embodiments detailed here within. FIG. 1 depicts an isometric view of an exemplary device, showing the frame 62, reinforcement gussets 6, upper front roller 12 and lower rear roller 13, and integrated chisels 11. Also shown are quick-changeover (QCO) assemblies 9, shaft brakes 17, jack stands 1, deck plate 2, lifting attachment 4, lifting pin 5, reinforcement gussets 6, integrated chisel dock 7, integrated chisel hydraulics 8, membrane roll 10, integrated chisel 11, upper front roller 12, lower rear roller 13, and lifting pins 5 and attachments 4. Rear ballast weights and sub-surface drip tape installation equipment are not shown for clarity. In some embodiments, each of the elements of the device are configured with at least four integrated chisels 11 and soil handling frame system. FIG. 2 and FIG. 3 show various views and overall dimensions of the frame, bracing, integrated chisel docks, hydraulics, and guide wheels. FIG. 2 is a top view of frame and chassis components showing the overall dimensions of the described implement. Rear ballast weights and sub-surface drip tape installation equipment are not shown for clarity. FIG. 3 is a side view of frame and chassis components showing the overall dimensions of the described implement. The integrated chisels, hydraulics, rear ballast weights and sub-surface drip tape installation equipment are not shown for clarity.

Figure 4:
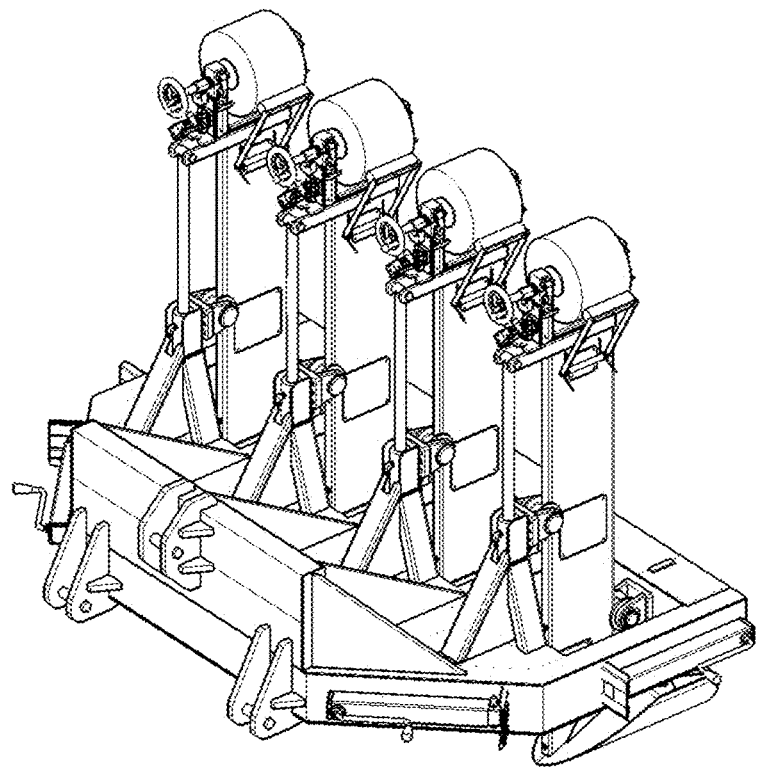
FIG. 4 depicts a view of the machine assembly with the integrated chisel hydraulics extended for machine non-deposition/movement mode.
Figure 5:
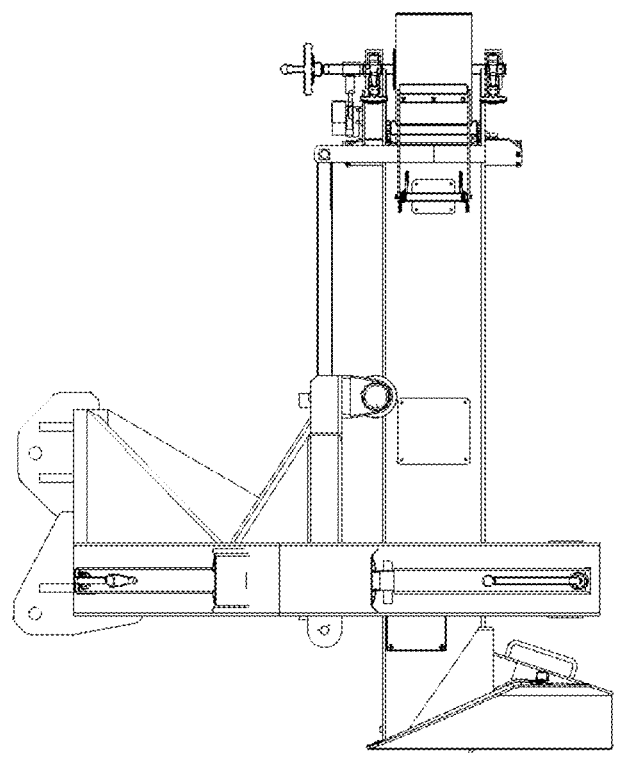
FIG. 5 depicts a side view of the machine assembly with the integrated chisel hydraulics extended for machine non-deposition/movement mode.
Figure 6:
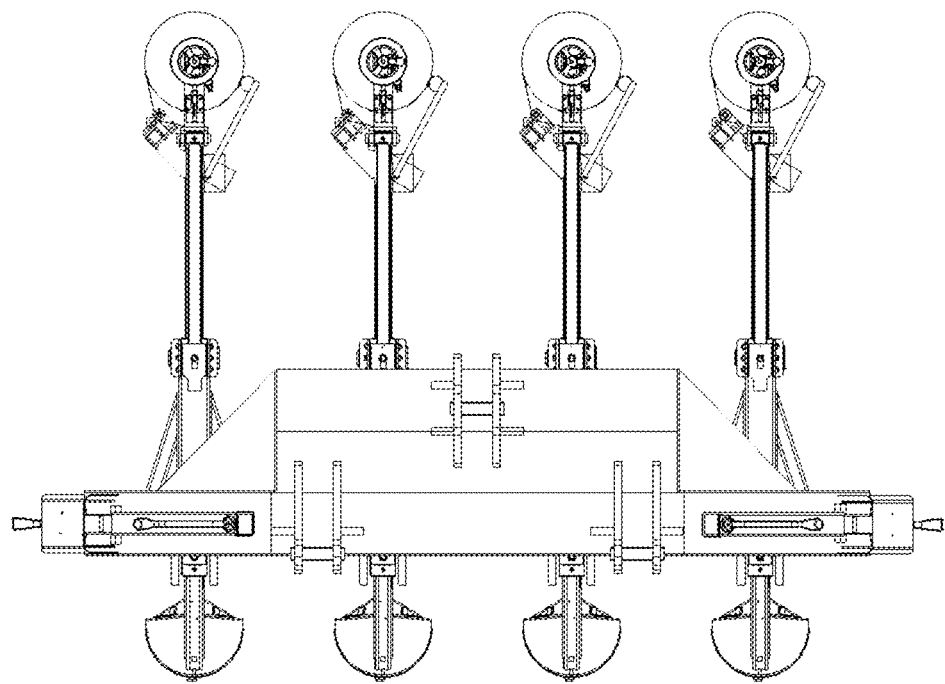
FIG. 6 depicts a front view of the machine assembly with the integrated chisel hydraulics extended.

FIGS. 4, 5, and 6 show the device with the integrated chisel hydraulics extended. The device is in this configuration during the repositioning of the machine from the end of one of run down a field to the beginning of the next run up the field. The device is also in this configuration when moving to and from its transport trailer (not shown) or from one installation field to the next if distances and speeds permit. The jack stands are also shown rotated 90 degrees and locked in installation mode. FIG. 4 depicts a view of the machine assembly with the integrated chisel hydraulics extended for machine non-deposition/movement mode. FIG. 5 depicts a side view of the machine assembly with the integrated chisel hydraulics extended for machine non-deposition/movement mode. FIG. 6 depicts a front view of the machine assembly with the integrated chisel hydraulics extended.

Figure 7:
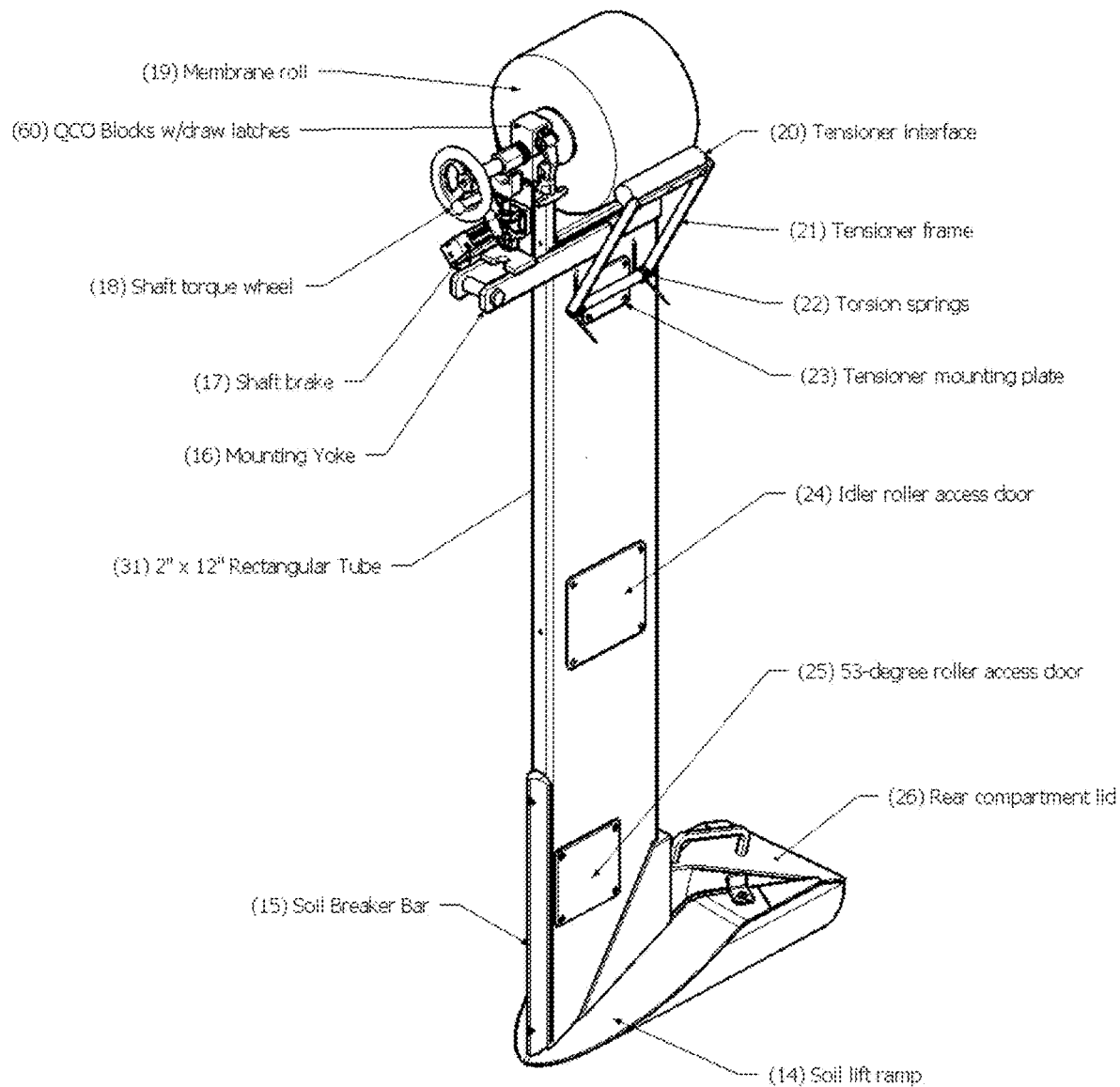
FIG. 7 depicts an integrated chisel.

FIG. 7 depicts an integrated chisel showing the membrane roll 19, quick changeover shaft and torque wheel 18, shaft brake (manual version) 17, integrated mounting yoke 16, soil breaker bar 15, membrane roll tensioner system 20, tensioner frame 21, torsion springs 22, tensioner mounting plate, access doors for idler 24 and 53-degree rollers 25, vertical lift soil ramp 14, and rear compartment lid 26. This embodiment shows a 2-inch×12-inch rectangular tube 31 as the vertical structural member. Other embodiments use wider rectangular tubing and also utilizing narrower, lower drag dimensions, with one embodiment being constructed from plate steel and machined to final dimensions. The plate steel assembly can be as thin as ½", for providing minimum soil drag forces.

Figure 8:
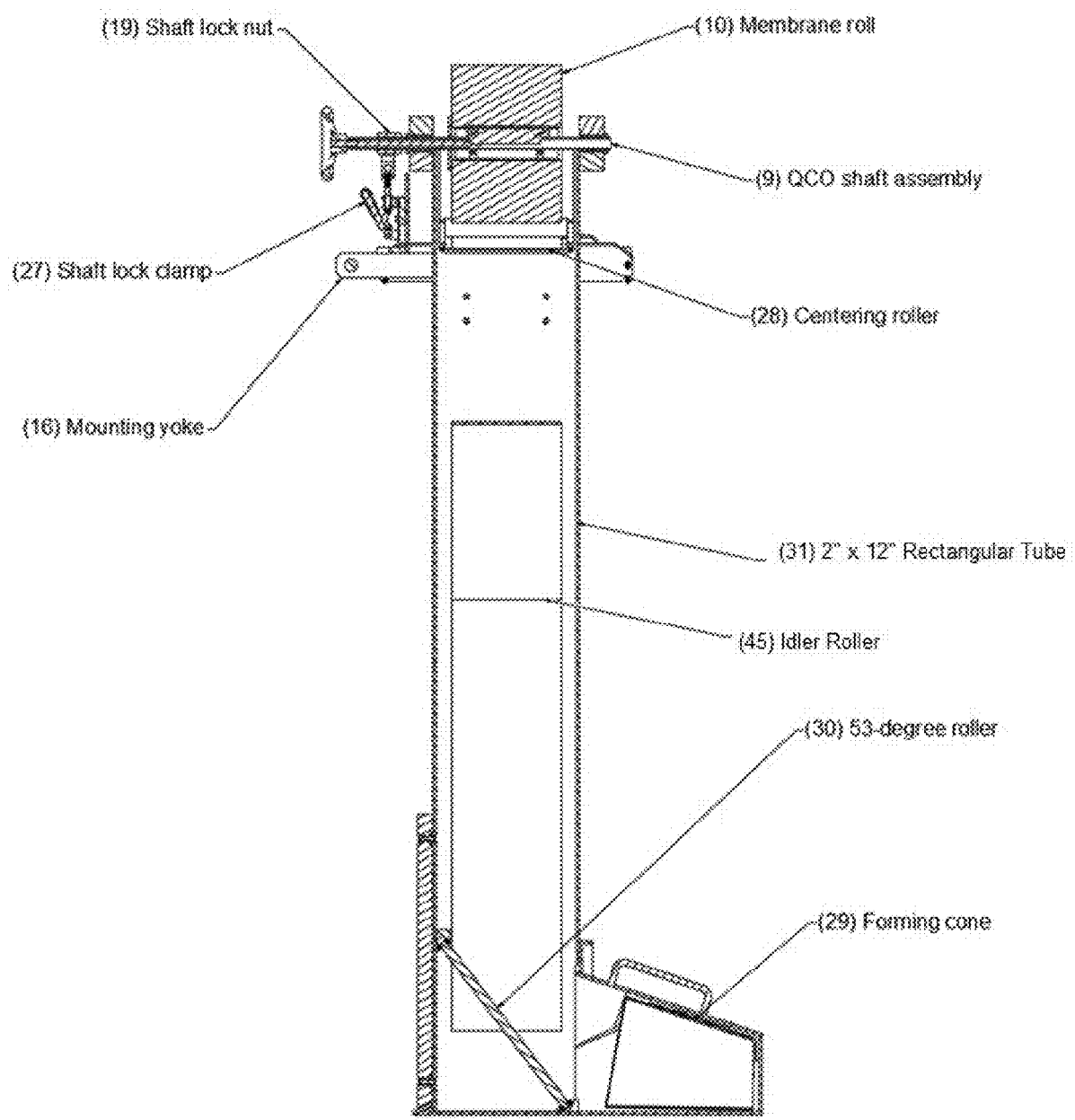
FIG. 8 depicts a section view of an integrated chisel. Air Knife is not shown in FIG. 8, but is shown in FIG. 32.
Figure 32:
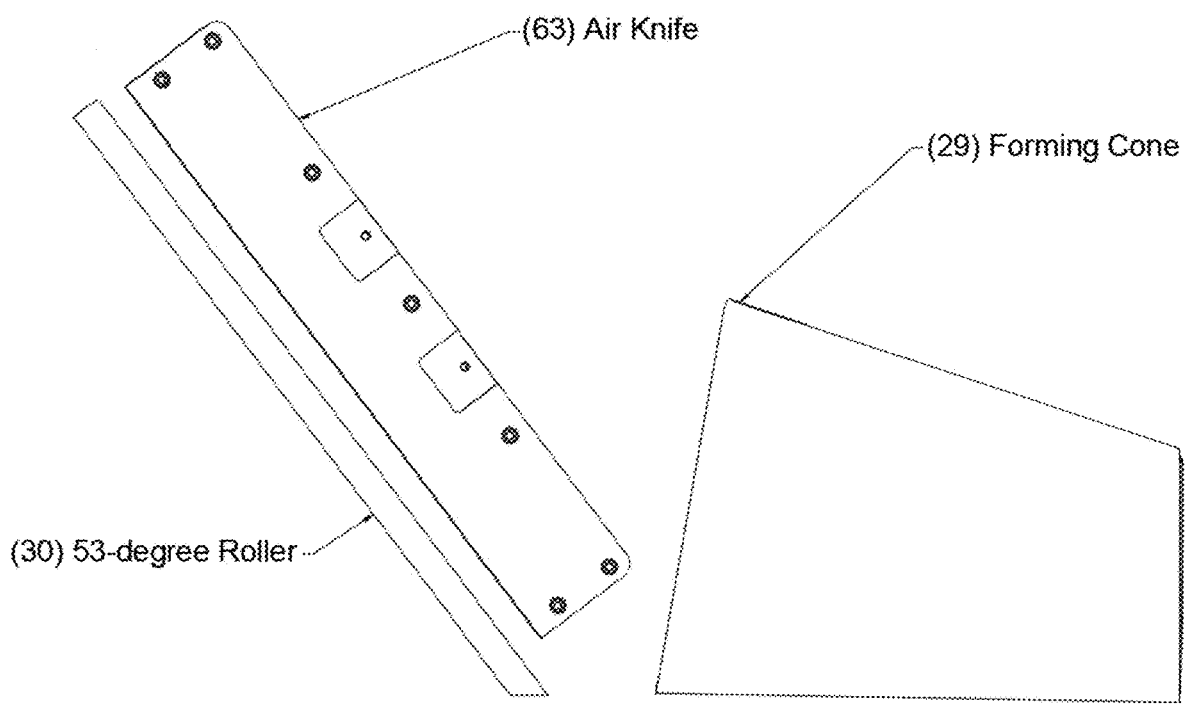
FIG. 32 depicts a section view of the integrated chisel showing the location of the air knife device in relation to the 53-degree roller and forming cone.

FIG. 8 depicts a section view of an integrated chisel showing the membrane roll 10, shaft lock clamp (manual version) 27, shaft lock nut 19, quick disconnect shaft assembly 9, centering roller 28, idler roller 45, integrated mounting yoke 16, soil breaker bar 15, 2"×12" rectangular structural tube 31, and forming cone 29. Air Knife is not shown in FIG. 8, but is shown in FIG. 32.

Figure 9:
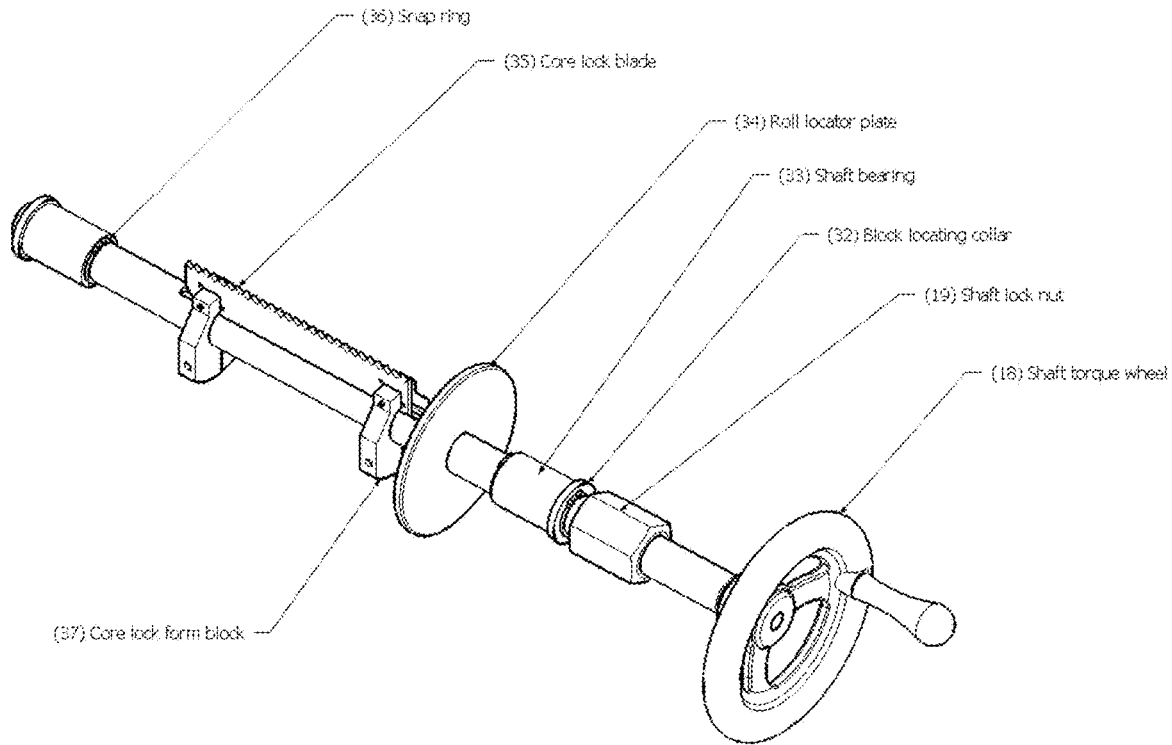
FIG. 9 depicts an isometric view of the quick changeover shaft assembly.

FIG. 9 depicts an isometric view of the quick changeover shaft assembly showing the shaft torque wheel 18, shaft lock nut 19, block locating collar 32, snap rings 36, bearings 33, core lock blade 35, roll locator plate 34, and core lock form block 37.

Figure 10:
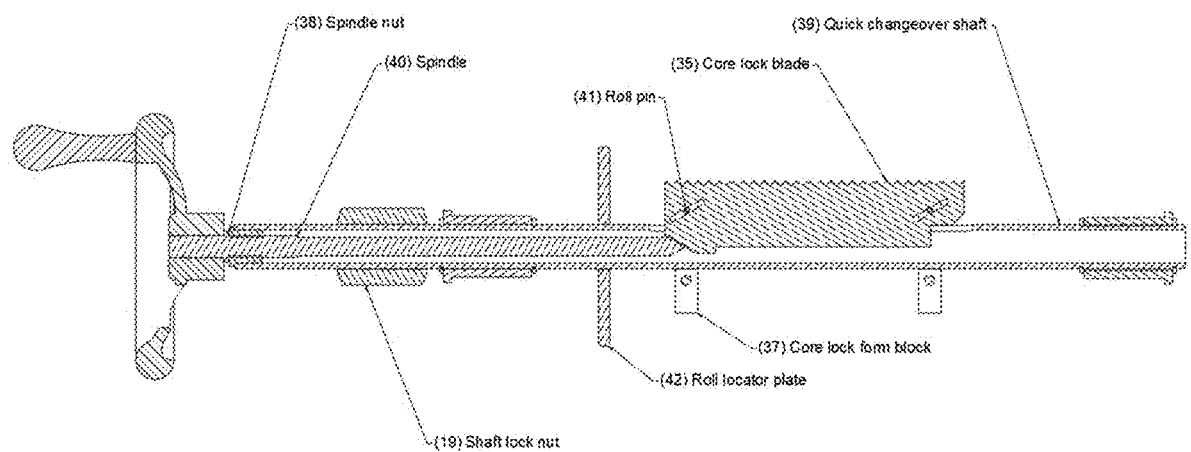
FIG. 10 depicts a section view of the quick changeover shaft assembly.

FIG. 10 depicts a section view of the quick changeover shaft assembly showing the shaft lock 19, core lock blade 35, roll pins 41, roll locator plate 42, core lock form block 37, spindle 40, shaft lock nut 19, quick changeover shaft 39, and spindle nut 38.

Figure 11:
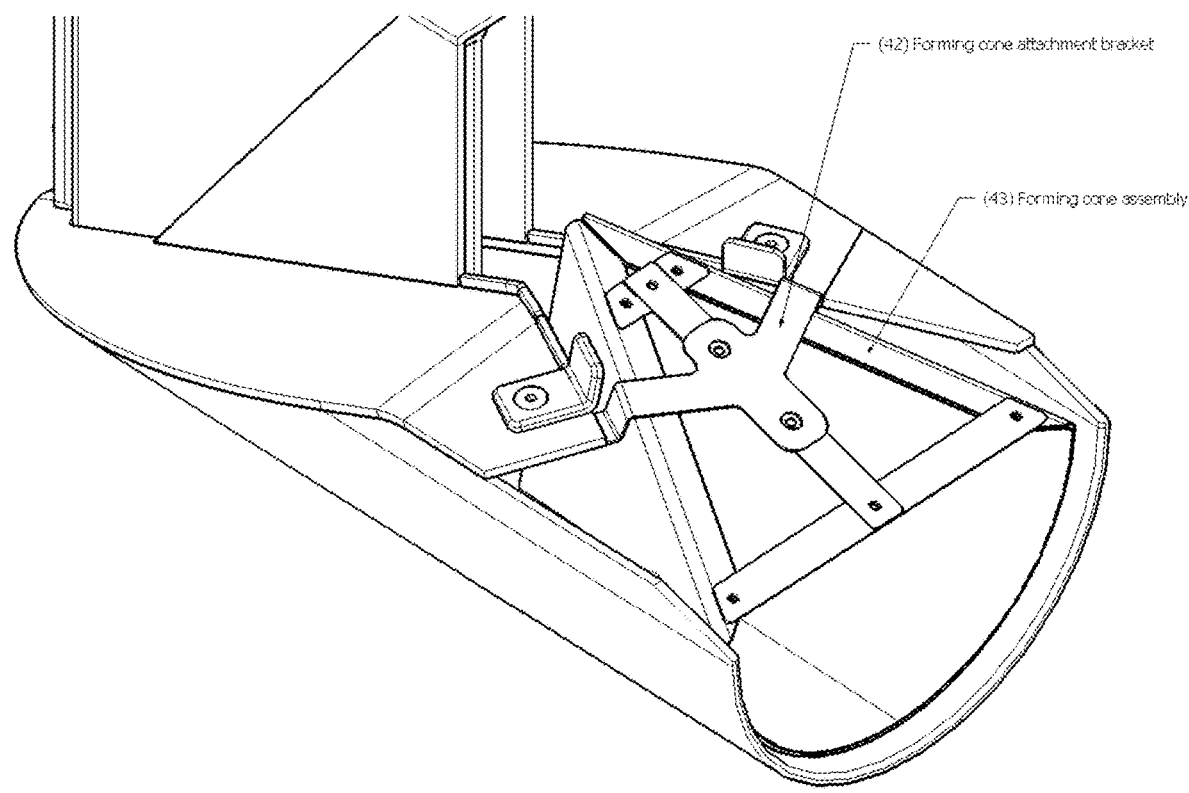
FIG. 11 depicts an isometric view showing the twelve-inch forming cone and forming cone attachment bracket in assembly position in the integrated chisel.

FIG. 11 depicts an isometric view showing the twelve-inch forming cone 43 and forming cone attachment bracket 42 in assembly position in the integrated chisel. The rear compartment lid has been removed for clarity.

Figure 12:
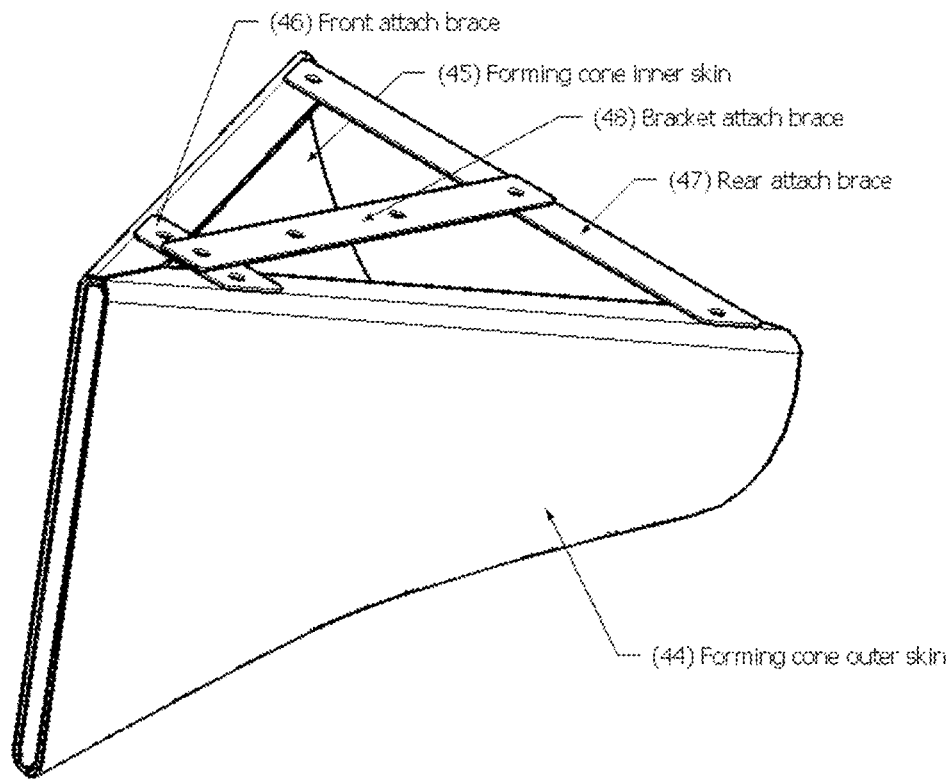
FIG. 12 depicts an isometric view of the twelve-inch forming cone.

FIG. 12 depicts an isometric view of the twelve-inch forming cone showing the general layout of the inner and outer skins 44, 45 at the front of the throat and the rear shape at the exit of the cone. Also shown are the attachment braces 46, 47 used for assembly to the forming cone attachment bracket 48.

Figure 13:
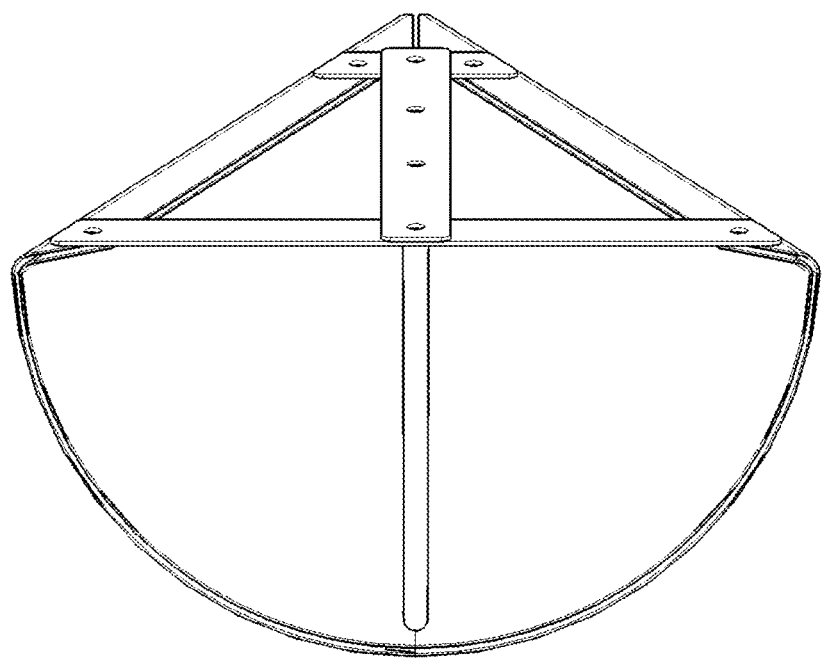
FIG. 13 depicts the rear view of the twelve-inch forming cone.

FIG. 13 depicts the rear view of the twelve-inch forming cone showing the general layout of the inner and outer skins at the exit of the cone as well as a partial view of the access hole for initial membrane threading cut into the inner skin. The gap between the inner and outer skins can be observed. Also shown are the attachment braces used for assembly to the forming cone attachment bracket.

Figure 14:
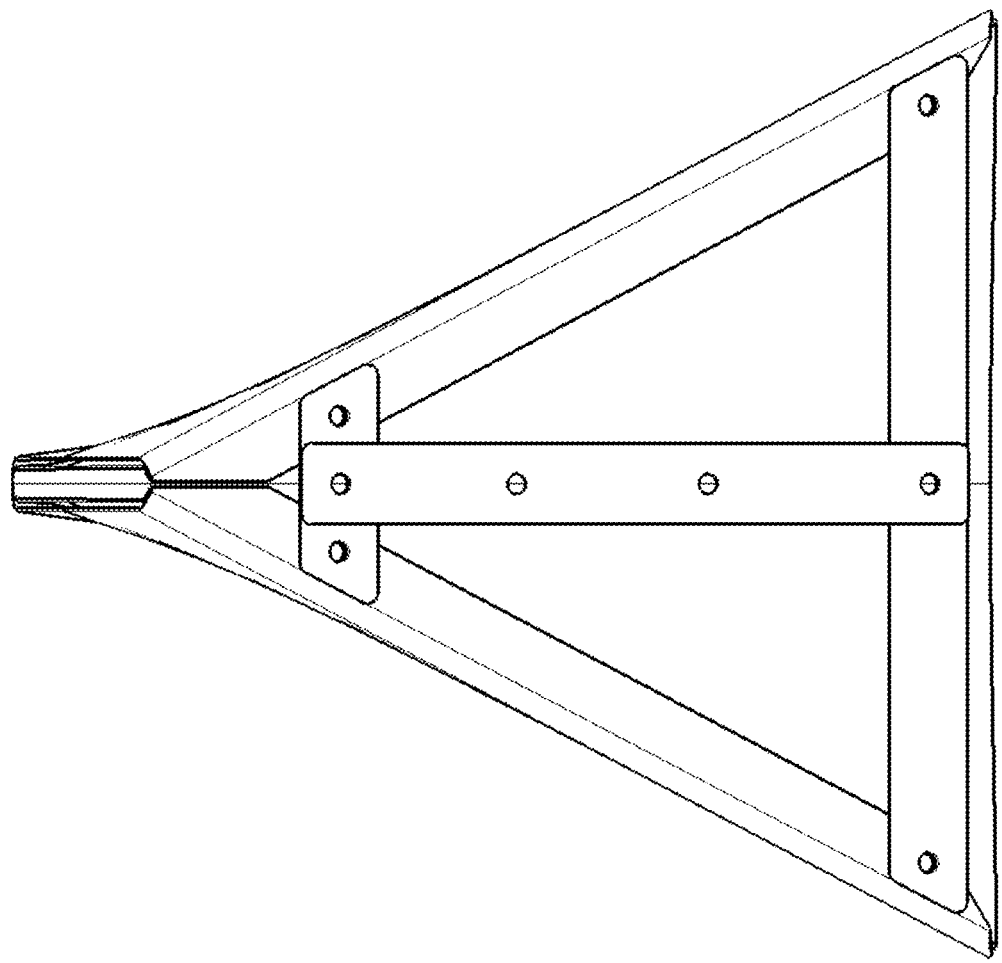
FIG. 14 depicts the top view of the twenty-four-inch forming cone.

FIG. 14 depicts the top view of the twenty-four-inch forming cone showing the general layout of the inner and outer skins and a complete view of the access hole for initial membrane threading cut into the inner skin. Also shown are the attachment braces used for assembly to the forming cone attachment bracket.

Figure 15:
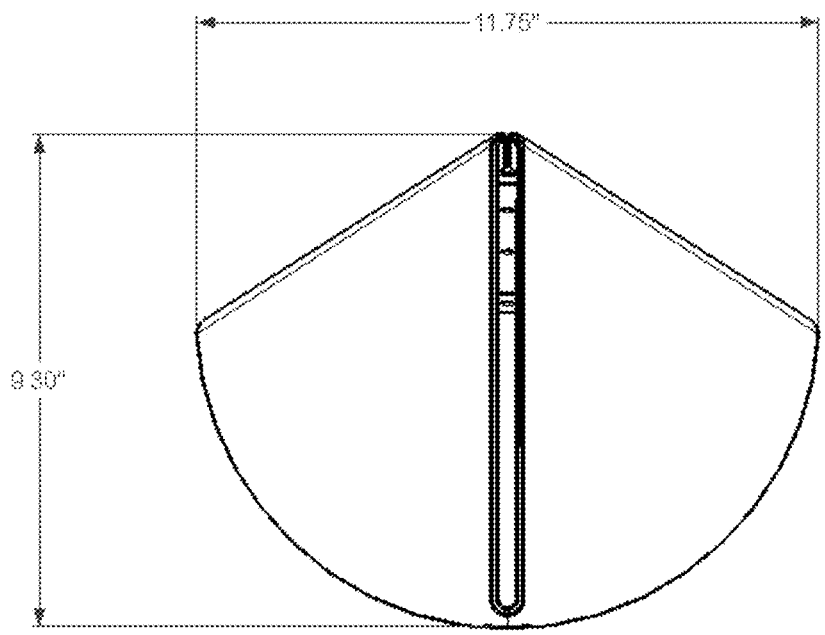
FIG. 15 depicts a front view showing the twelve-four-inch forming cone.

FIG. 15 depicts a front view showing the twelve-four-inch forming cone with the general layout of the inner and outer skins visible. The overall dimensions in a preferred embodiment are shown. The skins are either smooth or fabricated from textured metal. Lateral and horizontal attachment brackets can also be seen.

Figure 16:
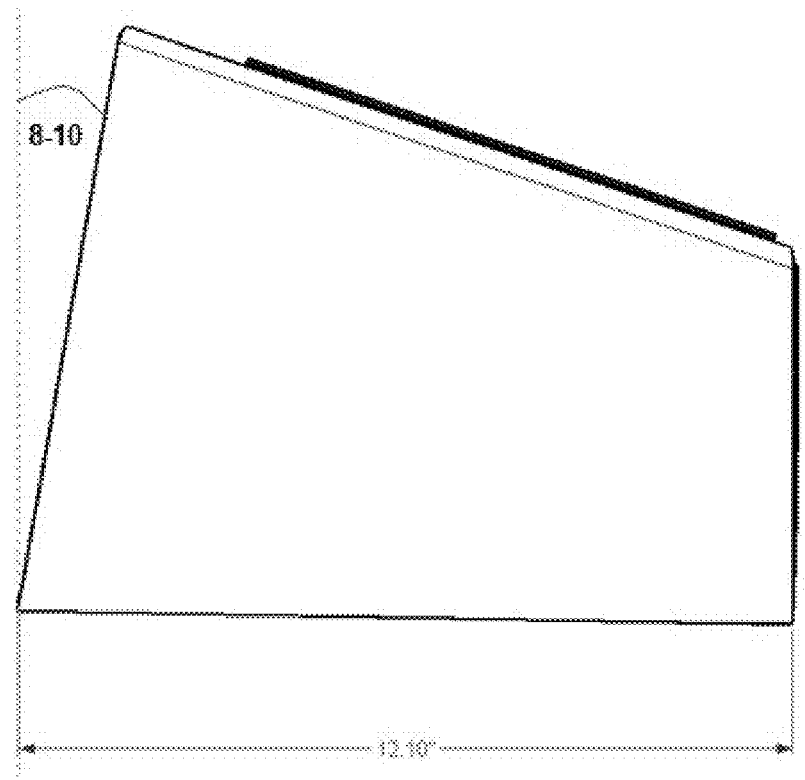
FIG. 16 depicts a side view of the twelve-four-inch forming cone.

FIG. 16 depicts a side view of the twelve-four-inch forming cone showing the general length of a preferred embodiment with overall length dimension and angle of top front kick-back as it related to the bottom front of the forming cone.

Figure 17:
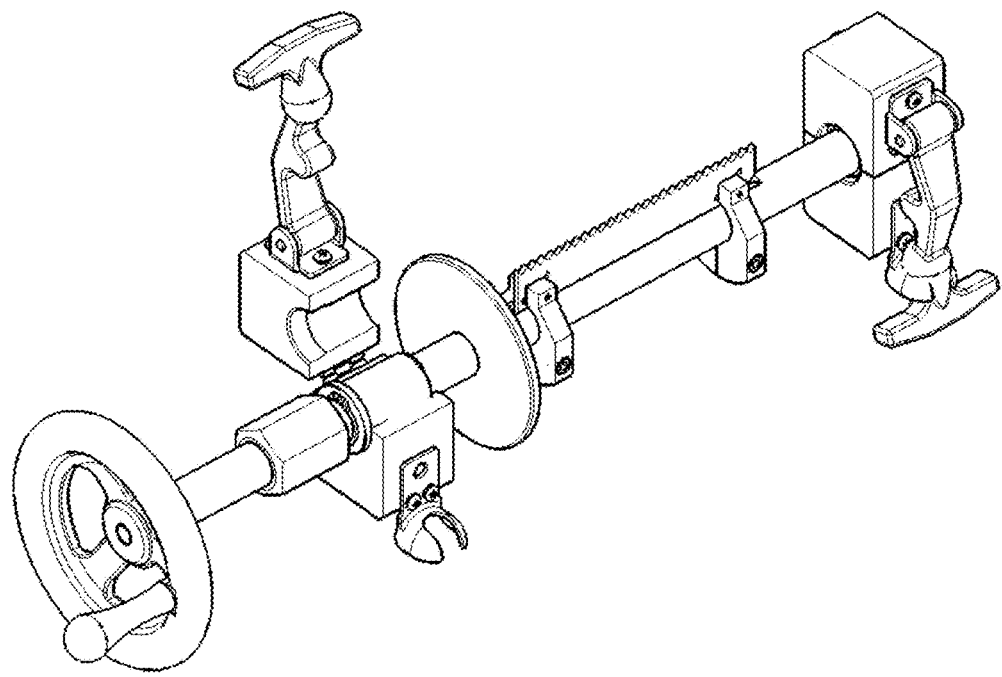
FIG. 17 depicts the quick changeover shaft and the integrated chisel-mounted quick changeover blocks with one of the blocks in the open position.

FIG. 17 depicts the quick changeover shaft and the integrated chisel-mounted quick changeover blocks with one of the blocks in the open position.

Figure 18:
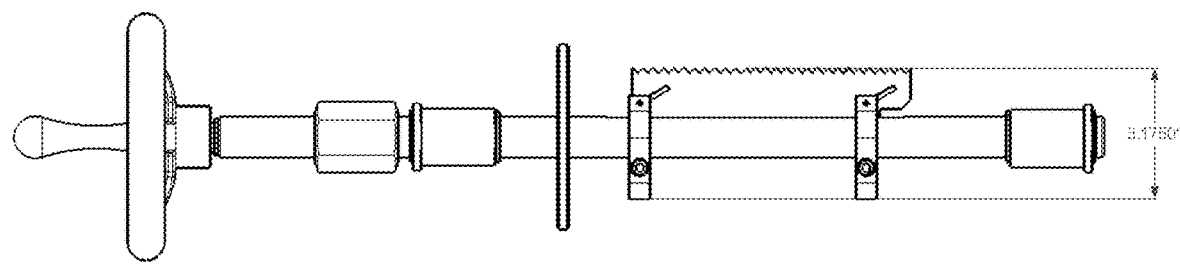
FIG. 18 depicts the quick changeover shaft and the integrated chisel-mounted quick changeover blocks with the quick changeover shaft engagement wheel with threaded pin fully engaged to lock the three-inch membrane roll core into position.

FIG. 18 depicts the quick changeover shaft and the integrated chisel-mounted quick changeover blocks with the quick changeover shaft engagement wheel with threaded pin fully engaged to lock the three-inch membrane roll core into position.

Figure 19:
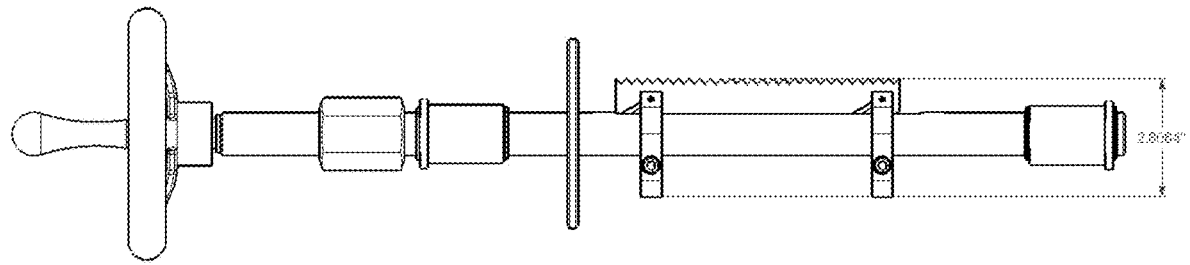
FIG. 19 depicts the quick changeover shaft and the integrated chisel-mounted quick changeover blocks with the quick changeover shaft engagement wheel with threaded pin fully disengaged to unlock the three-inch membrane roll core during roll changing.

FIG. 19 depicts the quick changeover shaft and the integrated chisel-mounted quick changeover blocks with the quick changeover shaft engagement wheel with threaded pin fully disengaged to unlock the three-inch membrane roll core during roll changing.

Figure 20:
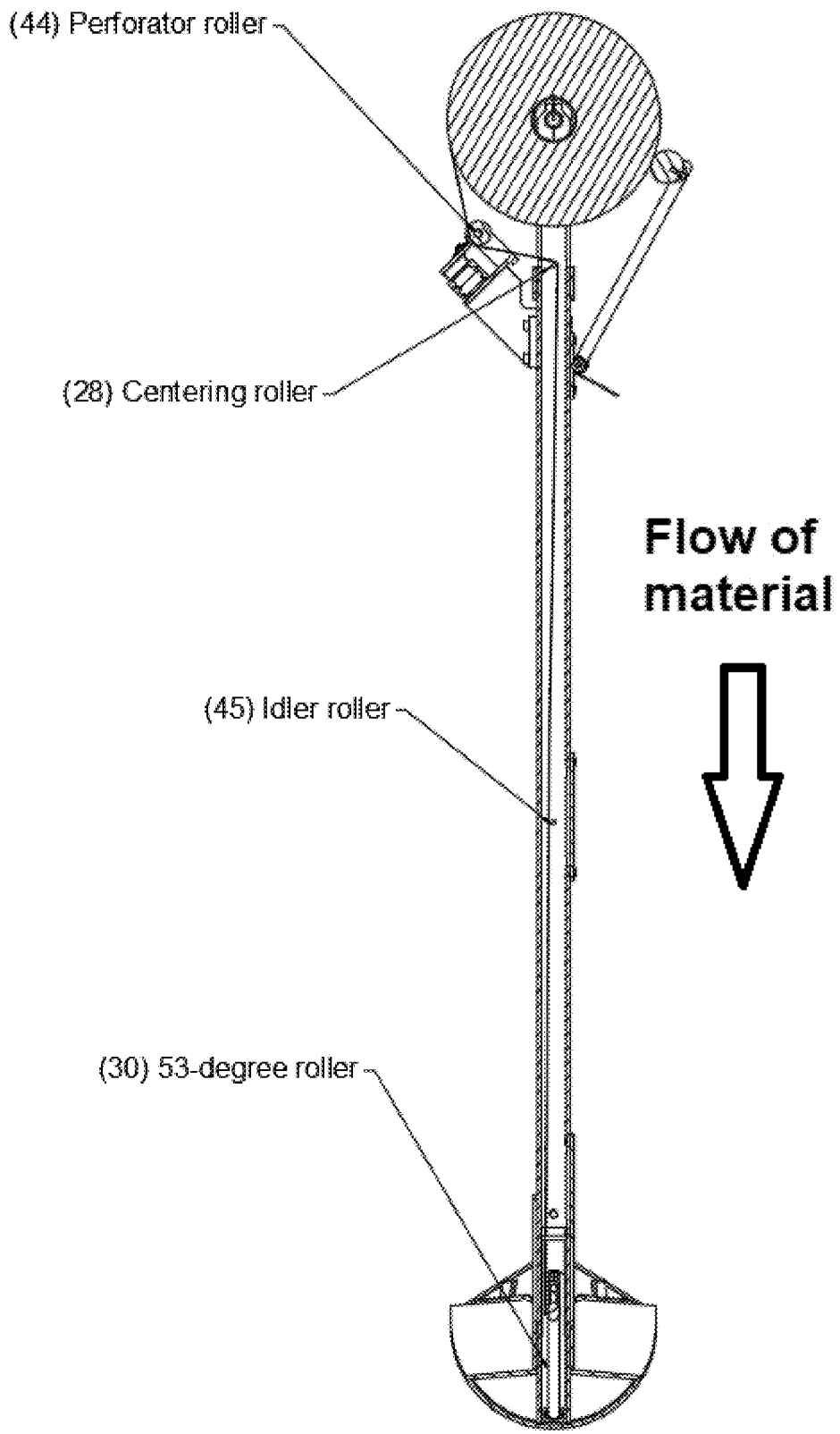
FIG. 20 depicts a section view of the integrated chisel.

FIG. 20 depicts a section view of the integrated chisel showing the flow of plastic membrane from the main roll over the perforator roller 44, the centering roller 28, the idler roller 45, and over the 53-degree roller 30.

Figure 21:
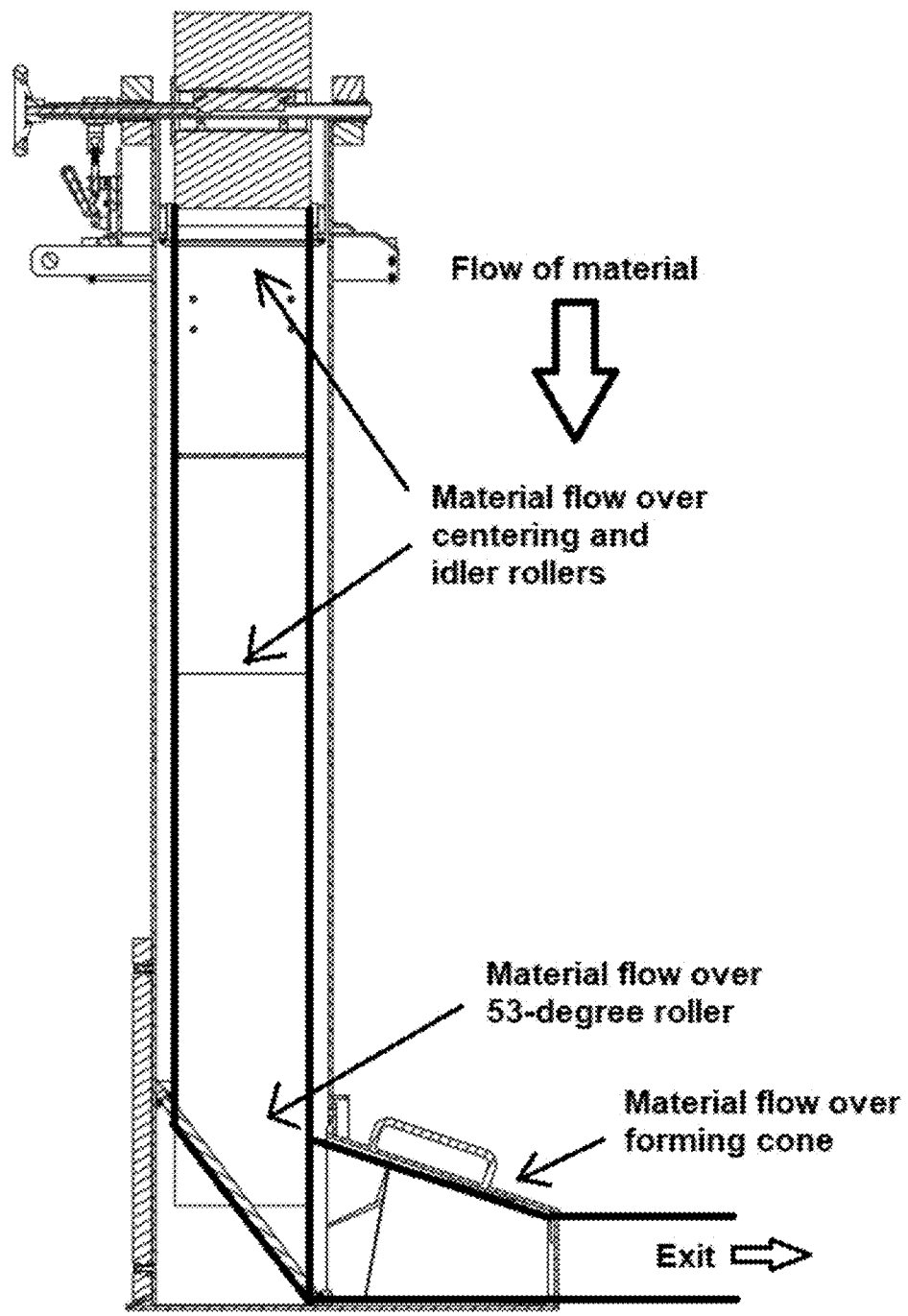
FIG. 21 depicts a section view of the integrated chisel.

FIG. 21 depicts a section view of the integrated chisel showing the flow of plastic membrane from the main roll over the perforator roller (not shown in current view), the centering roller, the idler roller, and over the 53-degree roller as it transitions to rear flow, over the forming cone and out the exit at the rear of the integrated chisel. Air Knife is not shown in FIG. 21, but is shown in FIG. 32.

Figure 22:
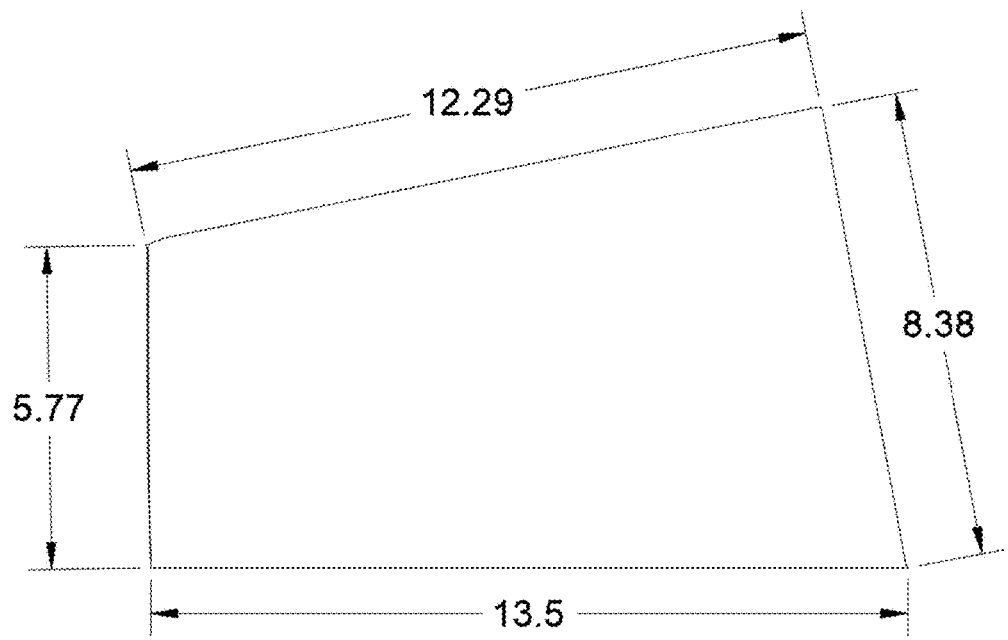
FIG. 22 depicts a side view of the twelve-inch forming cone with dimensions of the cone.

FIG. 22 depicts a side view of the twelve-inch forming cone with dimensions of the cone in a preferred embodiment.

Figure 23:
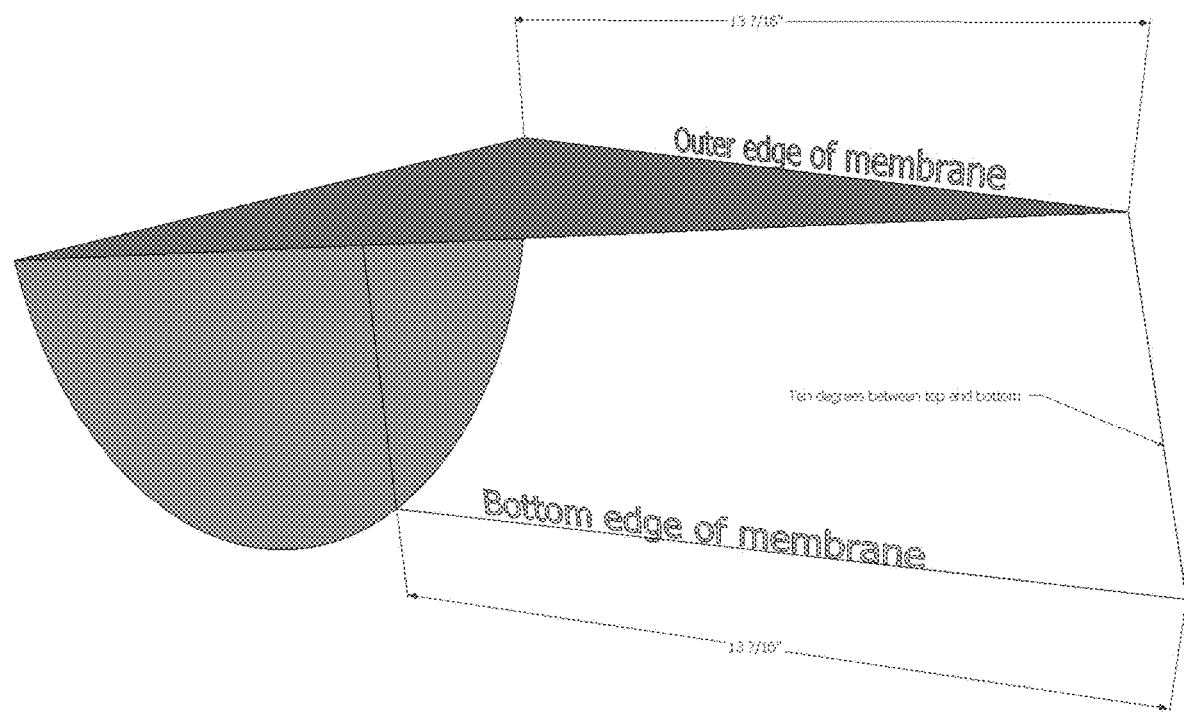
FIG. 23 an isometric representative view of the twelve-inch forming cone with travel distances for the edges of the membrane and the center fold, midway point, of the membrane showing equal travel distances.

FIG. 23 an isometric representative view of the twelve-inch forming cone with travel distances for the edges of the membrane and the center fold, midway point, of the membrane showing equal travel distances.

Figure 24:
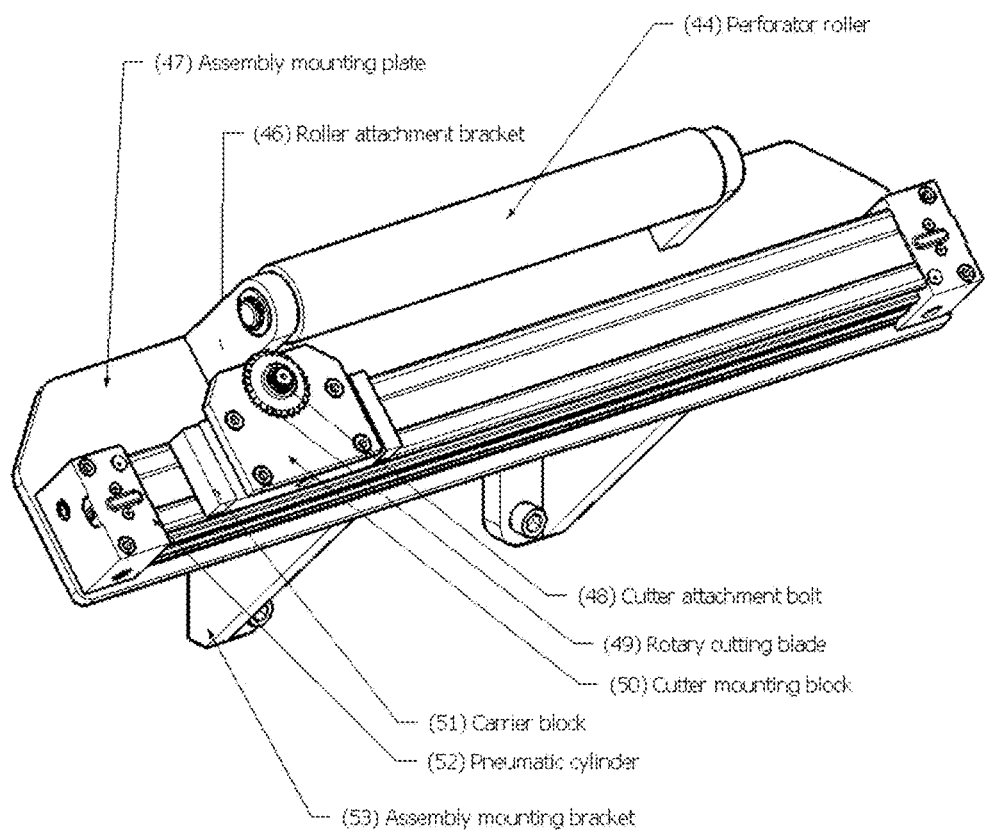
FIG. 24 depicts an isometric view of the membrane perforator assembly.

FIG. 24 depicts an isometric view of the membrane perforator assembly showing the mounting brackets 53, perforator roller 44, roller attachment bracket 46, assembly mounting plate 47, cutter attachment bolt 48, rotary cutting blade 49, cutter mounting block 50, carrier block 51, pneumatic cylinder 52, and assembly mounting bracket 53.

Figure 25:
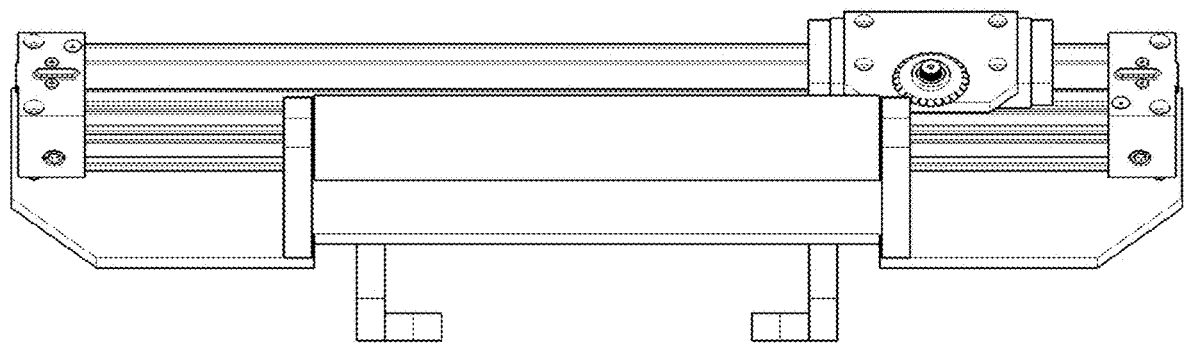
FIG. 25 a top view of the membrane perforator assembly.

FIG. 25 a top view of the membrane perforator assembly showing the mounting brackets and hardware, padded roller, cutter shuttle pneumatic assembly, and cutter shuttle.

Figure 26:
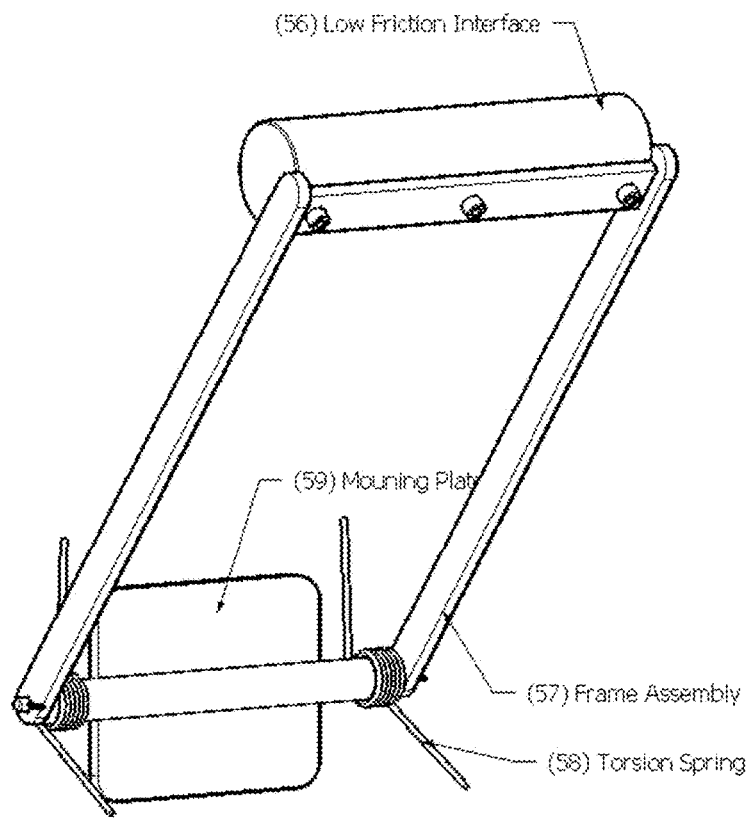
FIG. 26 depicts an isometric view of the membrane tensioner assembly.

FIG. 26 depicts an isometric view of the membrane tensioner assembly showing the mounting plate 59, torsion springs 58, low-friction interface 56, and frame assembly 57.

Figure 27:
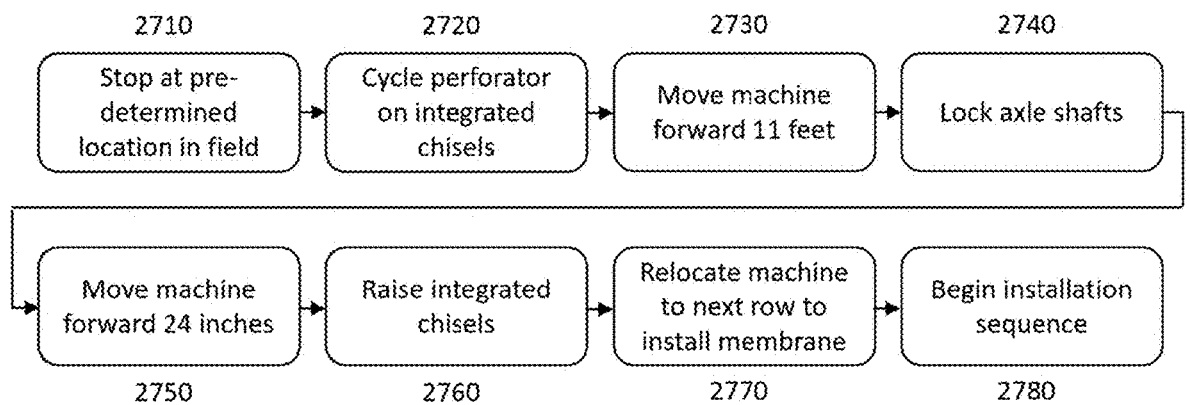
FIG. 27 depicts a process description with dimensions of the automated roll termination sequence initiated at the end of each pass down a field.

FIG. 27 depicts a process description with dimensions of the automated roll termination sequence initiated at the end of each pass down a field. As shown in FIG. 27, the exemplary process stops at a predetermined location in a field at step 2710, cycles the perforator on integrated chisels at step 2720, moves the machine forward at step 2730 (in this example, the machine is moved 11 feet), locks the axle shafts at step 2740, moves the machine forward at step 2750 (in this example, the machine is moved 24 inches), raises the integrated chisels and frame at step 2760, relocates the machine to a next row to install a membrane at step 2770, and begins the installation sequence at step 2780.

Figure 28:
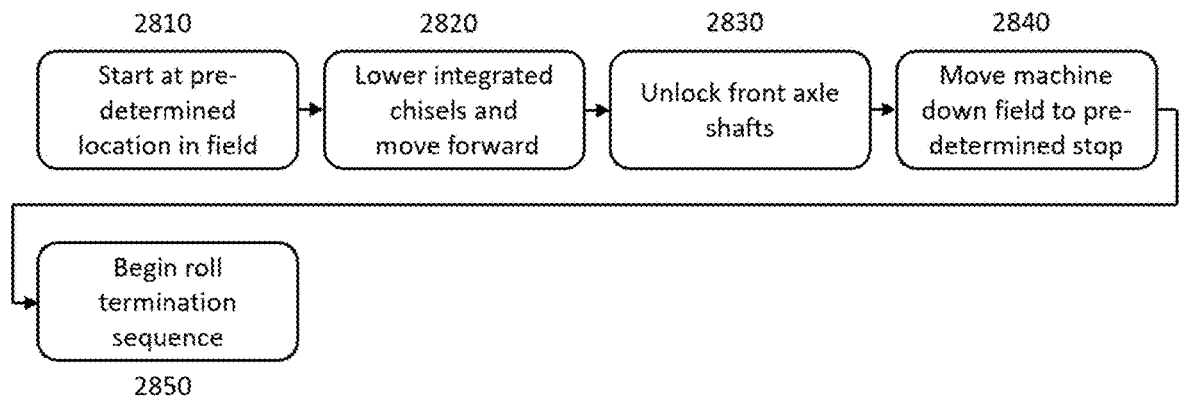
FIG. 28 depicts a process description of the automated roll engagement sequence initiated at the beginning of each pass down a field.

FIG. 28 depicts a process description of the automated roll engagement sequence initiated at the beginning of each pass down a field. As shown in FIG. 28, the exemplary process starts at a predetermined location in a field at step 2810, lowers all integrated chisels and begins moving frame at step 2820, unlocks axle shafts at step 2830, moves the machine down the field to a predetermined stop at step 2840, and begins the roll termination sequence at step 2850.

Figure 29:
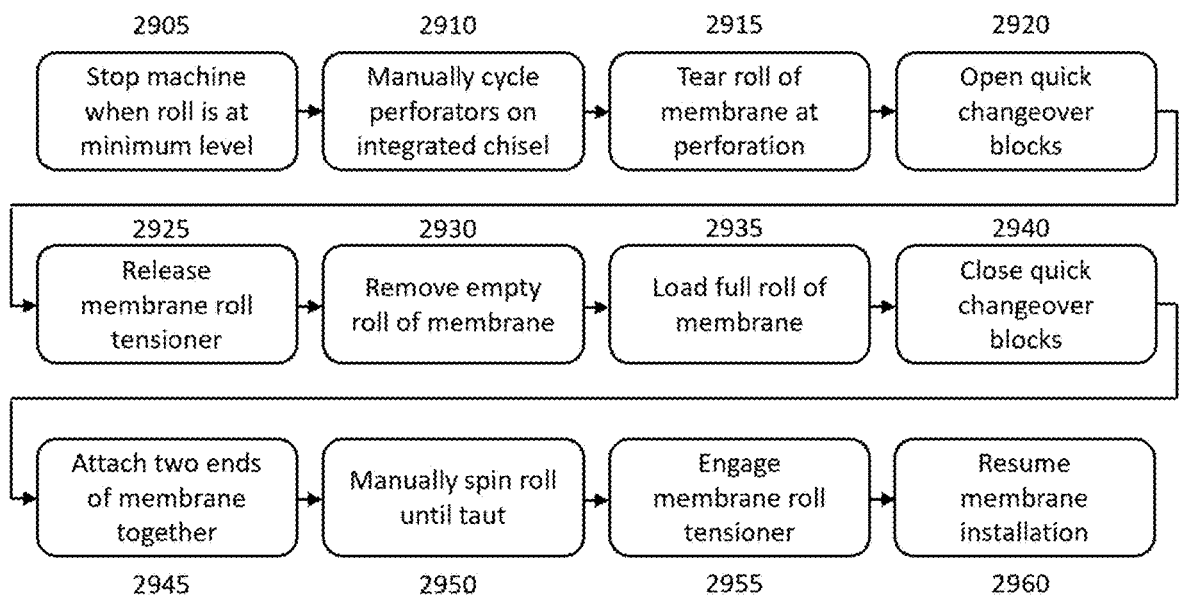
FIG. 29 depicts a process flow for utilizing the quick changeover assemblies to maximize machine efficiency.

FIG. 29 depicts a process flow for utilizing the quick changeover assemblies to maximize machine efficiency. As shown in FIG. 29, the exemplary process stops the machine when the roll is at a minimum level at step 2905, manually cycles perforators on an integrated chisel at step 2910, tears the roll of membrane at a perforation at step 2915, opens quick changeover blocks at step 2920, releases the membrane roll tensioner at step 2925, removes the empty roll of membrane 2930, loads a full roll of membrane at step 2935, closes the quick changeover blocks at step 2940, attaches the two ends of the membrane together at step 2945, spins the roll until taut at step 2950, engages the membrane roll tensioner at step 2955, and resumes membrane installation at step 2960.

Figure 30:
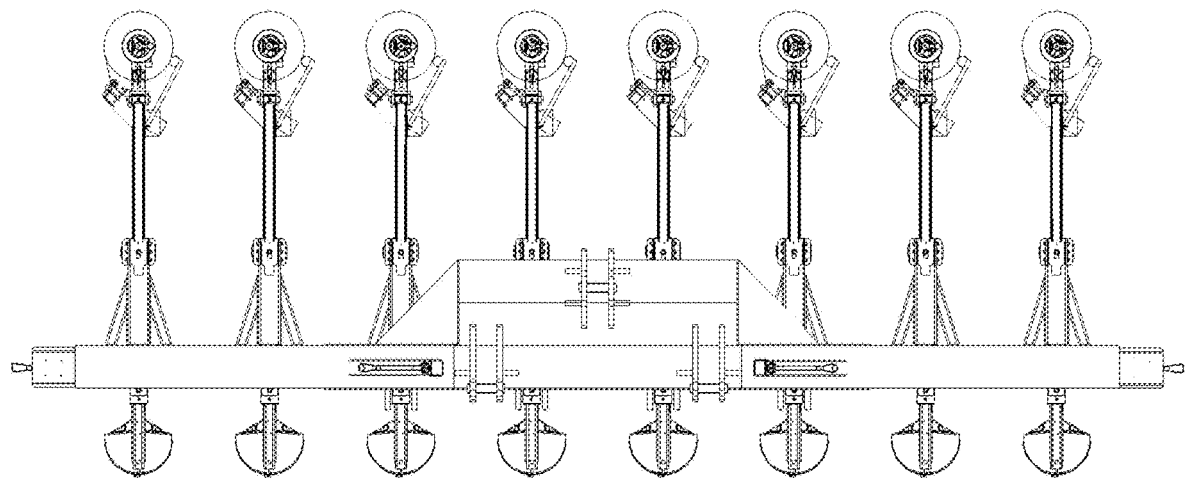
FIG. 30 depicts a front view of a machine utilizing the modular expansion design on each side of the machine to double productivity.

FIG. 30 depicts a front view of a machine utilizing the modular expansion design on each side of the machine to double productivity.

Figure 31:
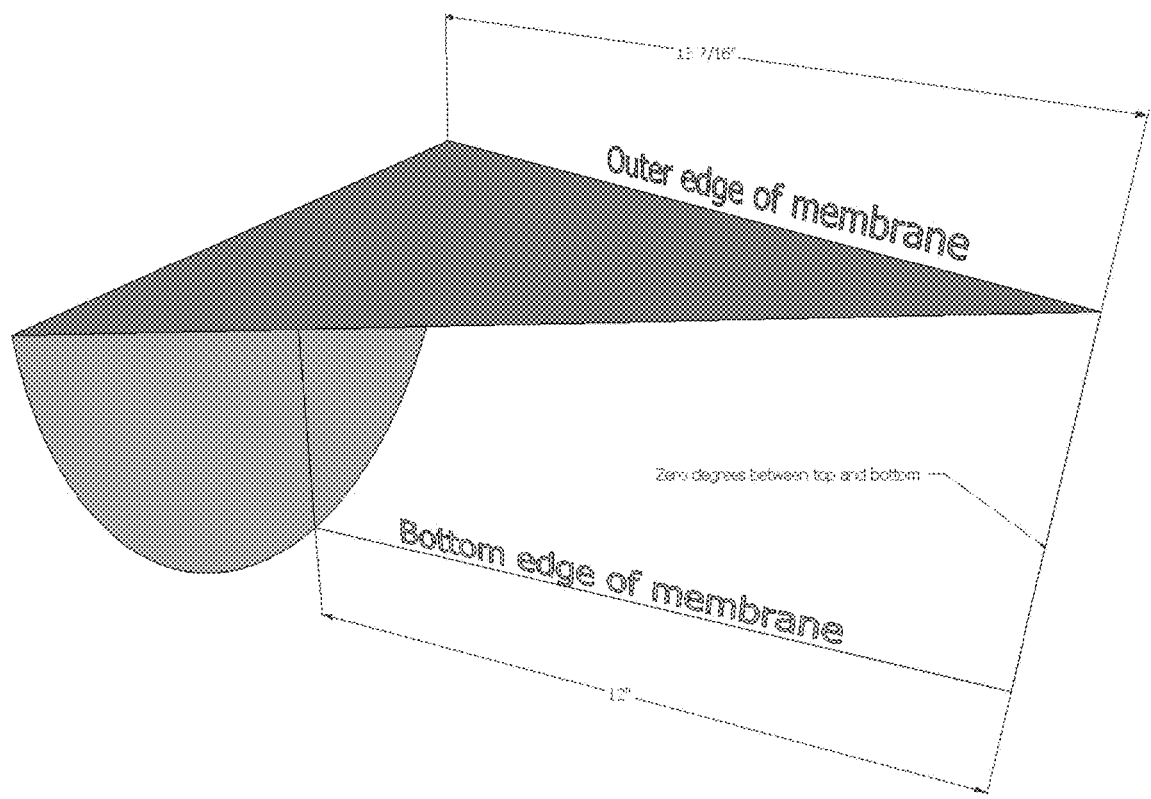
FIG. 31 depicts a representation of the different travel distances for membrane at the middle fold and edge over a forming cone with a vertical front edge.

FIG. 31 depicts a representation of the different travel distances for membrane at the middle fold and edge over a forming cone with a vertical front edge.

FIG. 32 depicts a section view of the integrated chisel showing the location of the air knife device 63 in relation to the 53-degree roller 30 and forming cone 29.

Figure 33:
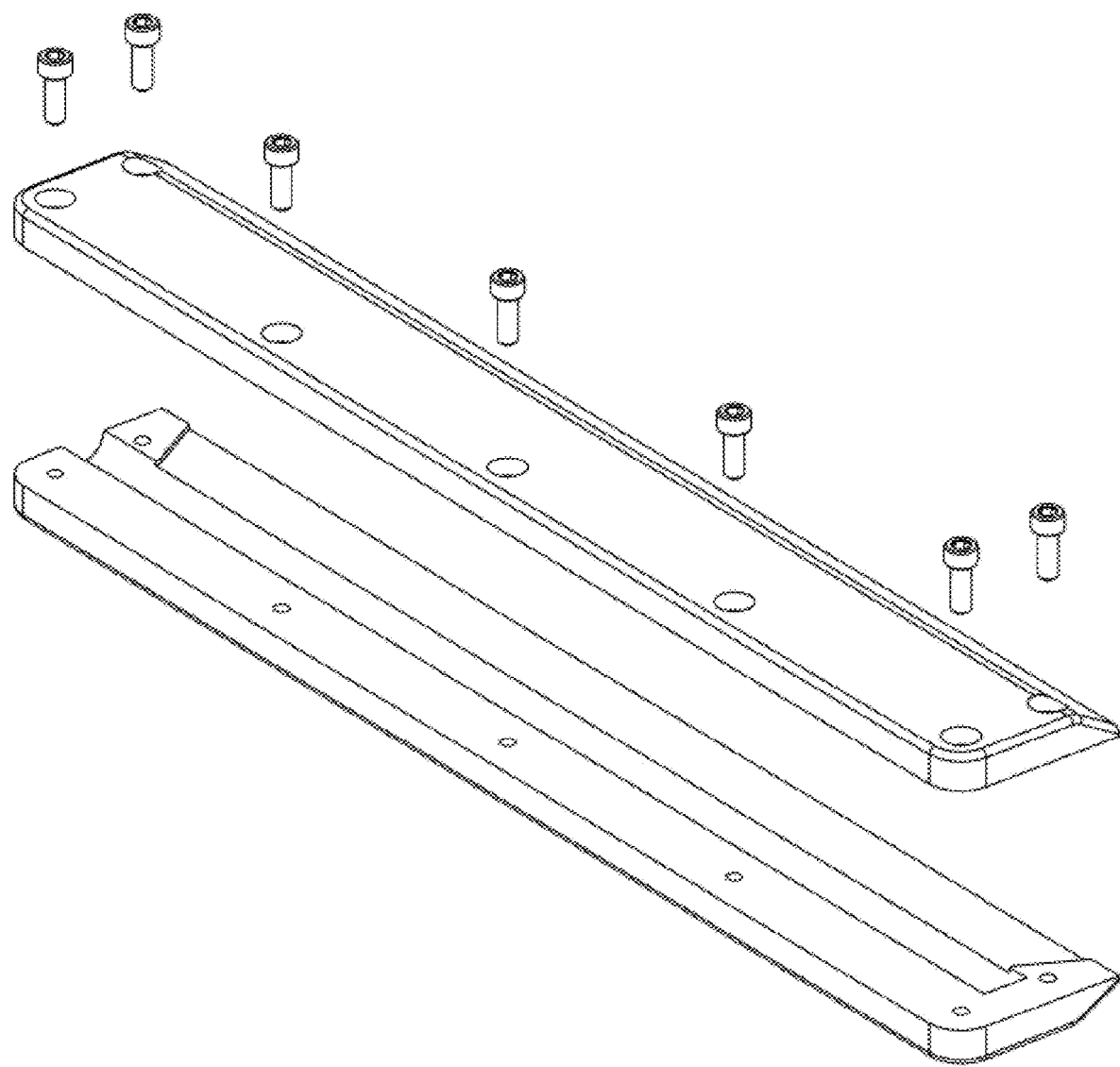
FIG. 33 shows an exploded view of the air knife.

FIG. 33 shows an exploded view of the air knife.

Figure 34:
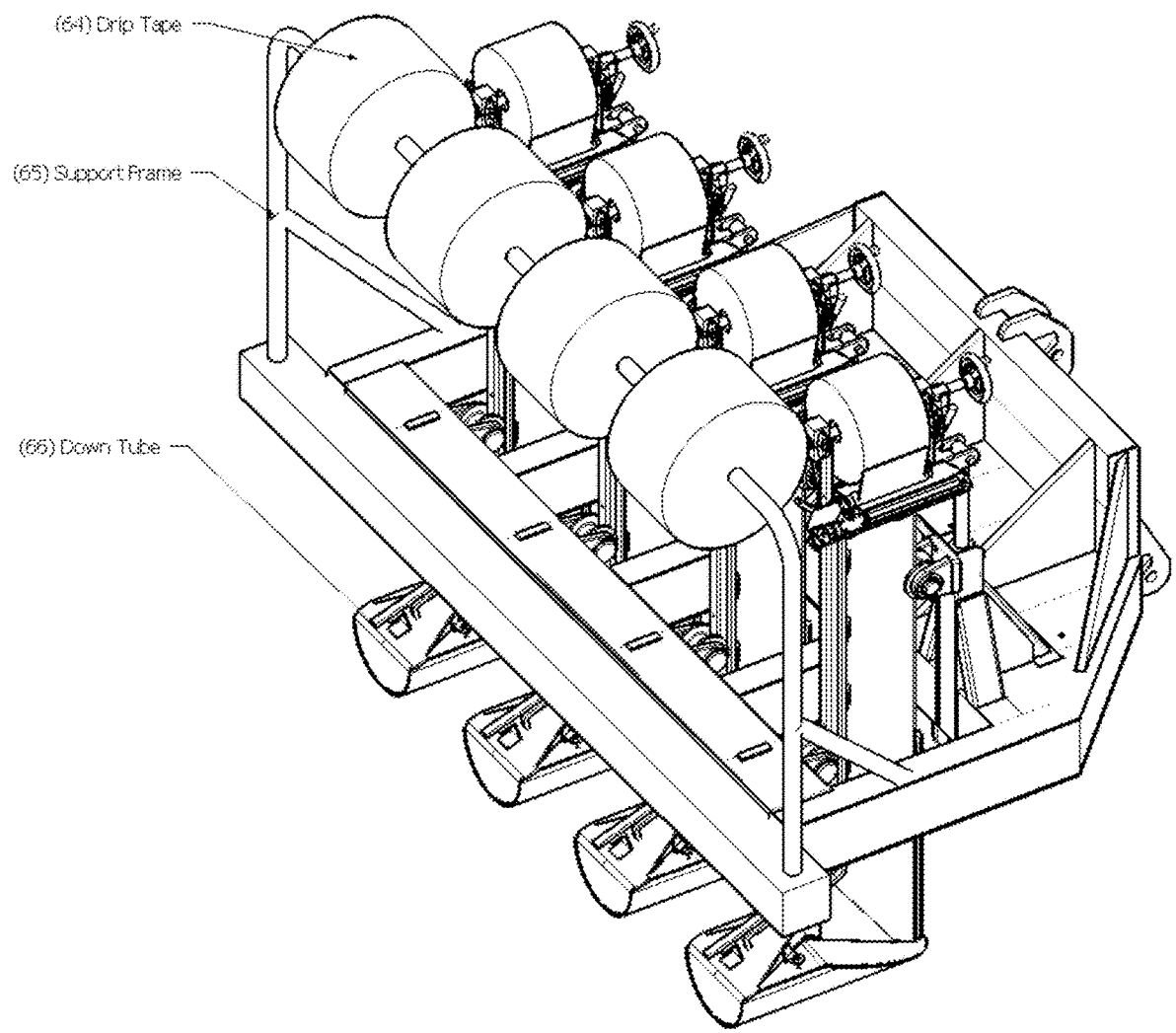
FIG. 34 shows the additional devices necessary to mount the sub-surface irrigation drip tape for simultaneous installation.

FIG. 34 shows the additional devices necessary to mount the sub-surface irrigation drip tape 64 for simultaneous installation. Also shown in FIG. 34 are support frame 65 and down tube 66.

Membrane Installation

In one exemplary embodiment, to install the membranes, the device, still in its transport mode with all hydraulics raised, shaft locks engaged, and roughly twelve to twenty-four inches of membrane at the exit of each integrated chisel, is positioned at one end of a grower's field in the headlands area near the beginning of the area to be installed. With the frame still raised on the back of the power source, the integrated chisel hydraulics (8) are lowered to bring the integrated chisels (11) to working depth. The frame is lowered by the power source while simultaneously moving forward to drop the integrated chisels (11) to working depth beneath the soil. The power source is momentarily stopped once the integrated chisels (11) have reached working depth. The integrated chisel (11) shaft locks (17) are released and the power source begins moving forward causing the membrane to flow out the back of the four integrated chisels (11) with an even starting point.

Once the power source has pulled the device down to the calculated end of the row on the grower's field, the machine momentarily stops. The operator/pilot then initiates the four chisel (11) semi-automatic pneumatic perforating device assemblies (52) to score the membrane. The power source then pulls the device forward, e.g. approximately eleven feet, or whatever distance is required to extend the perforated membrane twelve to twenty-four inches out the rear of the integrated chisels (11). The operator/pilot then engages all of the shaft locks (17) freezing the movement of the membrane roll (10) on top of each of the integrated chisels (11). The device is then moved forward, tearing each of the membranes at the perforation score marks, and creating an even ending of the row beneath the soil surface.

Each of the integrated chisels (11) now have roughly eighteen inches of membrane outside of the exit of the chisel. In this exemplary embodiment, the operator/pilot simultaneously raises the integrated chisel hydraulics (8) and entire device while moving forward to prepare the device to be moved to the next starting location, the next field, or the transport trailer for relocation.

These steps can be repeated until the entire field has membranes installed or vineyards/orchards have membranes installed along their drip lines. In this exemplary embodiment, the machine is attached to a power source, such as a tractor, for example, by means of the three-point hitch lifting attachments 4 and secured by means of the lifting pins 5. The tractor has an internal GPS that can provide automatic output signals to the machine to allow for semi-autonomous or fully autonomous operation of the machine for both terminating the membrane at the end of an installation row and for beginning a new installation row, eliminating the need for operator/pilot intervention. This will greatly increase both the safety and efficiency of the machine. In another exemplary embodiment, the two membrane rolls are automatically joined together, requiring only that the power source be temporarily stopped for the joining operation to take place.

Membrane Flow

In at least one embodiment, the device is equipped with a number of integrated chisels (11) that can deposit the impermeable membranes beneath the soil at varying depths. The membrane deposition is achieved by unwinding a roll of bi-folded membrane (10) from the top of the integrated chisel (11), using a friction brake (20) to maintain tension, and passing the bi-folded membrane continuously over the perforation roller (44), the centering roller (28), the idler roller (45), the 53-degree roller (30), over the forming cone (29), and out the rear exit of the integrated chisel.

To maximize the water-holding potential of the sub-surface membranes, they must be installed in a wrinkle-free condition. Wrinkles reduce the length of the side walls of the installed membranes and reduce water holding capacity by up 15% with moderate wrinkling. If excessive wrinkling occurs, the membrane will be ineffective. The first countermeasure to wrinkling in the bi-folded membrane is the membrane roll tensioner interface (20). This interface (20) puts a small amount of pressure and friction on the entire width of the membrane roll by using a low force, e.g. a force of no more than five pounds. This pressure is achieved by using simple torsion springs (22) on the assembly frame (21). This assembly can be unhooked to move the assembly frame 21 out of the way when the rolls are changed and re-hooked on a new roll. The torsion springs (22) will keep equal force on the membrane roll (10) at all times, with maximum force on a new, heavier roll as the torsion springs (22) are extended to minimum force on the near-empty roll as the torsion springs (22) are contracting to an almost-neutral position.

The forming cone (29) generally performs at least two functions. First, the forming cone 29 opens the bi-folded membrane and second, the forming cone opens the bi-folded membrane in a way that does not introduce internal stresses to the membrane as it flows over the forming cone's (29) surfaces. If uneven stresses are applied, in the form of pulling forces, or are present in the membrane, the ability of the device to advance a perforation from the top of the integrated chisel (11) over the rollers (28, 30, 44, 45) and forming cone (29) and out the rear exit will be compromised. Excessive pulling forces on the membrane will tear the perforation as it passes over the forming cone (29) which will leave the integrated chisel (11) portion of the membrane lodged somewhere on the forming cone (29) instead of the required distance out the rear of the integrated chisel.

To eliminate these forces, the distance that the outer edges of the bi-folded film travel are equal to, or very nearly equal to, the distance that the material at the center, or fold, of the bi-folded membrane travels. To accomplish this, the forming cone (28) engages the membrane at non-equal points by means of a ten-degree angle at the bottom front edge of the cone. The differences in travel distances are shown in FIG. 23 and FIG. 31.

With the bottom edge of the forming cone (29) now moved forward to equalize the travel distances of the edges and center of the membrane, the transition roller (30) must be aligned from the horizontal plane in such a way as to facility a smooth, wrinkle-free flow of membrane from the roller to the front edge of the forming cone (29) without wrinkles or slack that could damage the membrane. In at least one embodiment, for example, the angle is 53 degrees, but the present disclosure includes minor adjustments to this preferred angle as part of the disclosure.

To allow for the processing of recycled polymer material, in some cases the membrane will have 100% recycled material, an additional device, the air knife shown in FIG. 32, can be utilized. This is generally because recycled material has very high blocking, or 'stickiness,' that prohibit it from flowing properly through the device and over the forming cone (28). The air knife uses a thin blade of compressed air to force open the membrane (10) after it comes off of the transition roller (30) and just before it enters the forming cone (29).

Membrane Perforation

When the device reaches the end of a row when depositing the sub-surface membranes, the membranes follow a method of terminating at an equal distance from the beginning of each installed row for uniformity. This process should both efficiently terminate the ends of the membrane rolls and prepare the machine for the next row of deposition in a way that eliminates the need for operator/pilot intervention, which will have a negative impact on both safety and efficiency.

To achieve a uniform installation of the sub-surface membranes and keep a high level of operational efficiency, a perforator assembly (47-52) is utilized in conjunction with the shaft brake (17) at the transition points in an application area. These details are found in FIGS. 7, 24, and 25.

The membrane perforator assembly is made up of an assembly mounting plate (47), assembly mounting brackets (53), and roller attachment brackets (46) which is bolted directly to the side of the integrated chisel (11). A perforator roller (44) is attached to the roller attachment brackets (46) by means of a shaft and snap rings. A pneumatic cylinder (52) which is bolted to the mounting plate (47) and utilizes a carrier block (51) to interface with the cutter mounting block (50) and the rotary cutting blade (49). The pneumatic cylinder (52), when actuated by the operator/pilot or actuated automatically or semi-automatically, moves the carrier block (51) down the length of the pneumatic cylinder (52) pressing the rotary cutting blade (49) against the perforator roller (44) during cycling to score through the double-thickness of the bi-folded membrane. The device, with the carrier block (51) at the opposite end of the pneumatic cylinder (52), is ready to be cycled again.

Membrane Roll Quick Changeover

The membrane rolls in this embodiment hold between 3,000 to 10,000 feet of material, necessitating the frequent changing of the integrated chisels (11) throughout the operation of the device on a grower's property. The present design incorporates a number of novel components to facilitate the safe, efficient changing of rolls to minimize the time lost during operating hours.

The quick changeover (QCO) process utilizes two sub-assemblies, the quick changeover block assemblies (60), which are welded to the integrated chisels (11), and the quick changeover shaft assembly (9). The quick changeover block assemblies (60) include a lower, fixed block attached to a structural member of the integrated chisel (11), with the member being, in one example, a 2×12 rectangular tube. The lower block can be attached to the upper block by means of a strap hinge that is bolted to both blocks. The upper and lower blocks can be held closed during operation by means of a draw latch.

To change an empty or near empty roll of membrane (10) and replace it with a full roll, the operator/pilot first cycles the pneumatic cylinder (52) on the perforator assembly to create an end point for the near-empty roll. The membrane tensioning device (56, 57) is unlatched and allowed to tilt out of the way. The operator/pilot will open both draw latch release handles on the QCO block assemblies (60) on the integrated chisel (11) and lift out the empty or nearly empty roll of membrane. The open quick changeover assembly (60) can be seen in FIG. 17. The membrane is torn at the perforation and the cardboard core can optionally be put into a waste receptacle, which, in at least one example, can be on the device. The operator/pilot then either manually or with a lift-assist, locates the new roll (10) onto the quick changeover blocks (60), and, in at least in one exemplary embodiment, uses the shaft assembly block locating collar (32) for precision placement. The end of the new roll is joined to the end of the old roll using an adhesive, heat-stake, or ultrasonic welding process to ensure an adequate bond. The quick changeover blocks (60) are then closed by reattaching the draw latches. The membrane tensioning device (56, 57) is then re-attached, engaging the new roll of membrane. Any slack in the membrane roll created when joining the two rolls can be taken up, e.g. by hand by the operator/pilot.

To empty the exhausted roll of film (10) from the quick changeover shaft assembly (9), the operator/pilot turns the shaft torque wheel (18), e.g., in at least one example, in a counterclockwise direction, to disengage the core lock blade (35). The entire assembly (9) can now be separated from the near-empty membrane cardboard core. The operator/pilot then takes the shaft assembly (9) and inserts it into a new roll of membrane (10) and pushes the shaft assembly (9) into the core until the roll locator plate (34) contacts the edge of the cardboard core. The shaft torque wheel (18) is now turned clockwise until there is strong engagement with the core lock blade (35) and the core. The new roll is now ready to be located to the integrated chisel (11).

Simultaneous Sub-Surface Drip Tape Installation

For those applications where it is desired to install sub-surface drip irrigation tape simultaneously with the membrane system, a support frame (59) and downtube (60) are utilized. The drip tape (61) is deposited at the top center of the subsurface membrane and held in place by the back-filling soil as the implement travels down the field. The drip-tape is cut after the chisel (11) is brought out of the ground at the end of a run down the length of the field. The individual runs of drip-tape can now be tied into the larger field-wide irrigation system.

The present disclosure can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description of the disclosure is provided as an enabling teaching of the disclosure in its best, currently known aspect. Those skilled in the relevant art will recognize that many changes can be made to the aspects described, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A sub-surface membrane deposition device comprising:
a movable frame;
at least one chisel attached to the frame;
hydraulics to raise and lower the at least one chisel from the frame; and,
a membrane deployable to a sub-surface level by the at least one chisel as the movable frame is moved;
wherein the device performs high-speed installation by cutting the membrane with a perforator and by using a quick changeover shaft assembly to end and start membrane deposition through operation of the device.

2. The sub-surface membrane deposition device of claim 1 wherein the membrane is provided on a membrane roll on the frame.

3. The sub-surface membrane deposition device of claim 2 wherein the membrane roll is rotatable on an upper surface of the frame to unwind the membrane from the membrane roll on a top of the at least one chisel.

4. The sub-surface membrane deposition device of claim 2 wherein the device includes a quick changeover shaft assembly and a perforator assembly that help minimize idle time.

5. The sub-surface membrane deposition device of claim 1 wherein the chisel includes a forming cone that dispenses the membrane in a wrinkle-free condition.

6. The sub-surface membrane deposition device of claim 5 wherein the forming cone is approximately twelve inches in width.

7. The sub-surface membrane deposition device of claim 5 wherein the membrane is bi-folded and wherein the forming cone opens the bi-folded membrane without introducing internal stress to the membrane.

8. The sub-surface membrane deposition device of claim 5 wherein a distance that outer edges of the bi-folded membrane travel are substantially equal to a distance that a center of the bi-folded membrane travels.

9. The sub-surface membrane deposition device of claim 1 wherein the perforator scores the membrane above the sub-surface level.

10. A sub-surface membrane deposition device comprising:
a movable frame;
at least one chisel attached to the frame;

hydraulics to raise and lower the at least one chisel from the frame; and, a membrane deployable to a sub-surface level by the at least one chisel as the movable frame is moved;

wherein the chisel includes a forming cone that dispenses the membrane in a wrinkle-free condition;

wherein the forming cone includes a ten-degree angle at a bottom front edge of the forming cone that engages the membrane at non-equal points.

11. A method of deposing a membrane to a sub-surface level comprising:

providing a movable frame, at least one chisel attached to the frame, hydraulics to raise and lower the at least one chisel from the frame, and a membrane;

lowering the at least one chisel with the hydraulics to the sub-surface level;

moving the frame and at least one chisel forward;

deploying the membrane to the sub-surface level with the at least one chisel;

wherein the device performs high-speed installation by cutting the membrane with a perforator disposed at the frame and by using a quick changeover shaft assembly to end and start membrane deposition through remote operation of the device.

12. The method of claim 11 wherein the membrane is provided on a membrane roll on the frame, and the method further comprises: rotating the membrane roll on an upper surface of the frame to unwind the membrane from the membrane roll on a top of the at least one chisel.

13. The method of claim 12 wherein the device includes a quick changeover block on the at least one chisel and wherein the quick changeover block, in conjunction with quick changeover shaft assemblies and a perforator assembly, allows a new membrane from a new membrane roll to be joined to the membrane from the membrane roll through heat staking or ultrasonic welding.

14. The method of claim 11 wherein the perforator scores the membrane above the sub-surface level.

15. The method of claim 11 wherein the chisel includes a forming cone that dispenses the membrane in a wrinkle-free condition.

16. The method of claim 15 wherein the forming cone is approximately twelve inches in width.

17. The method of claim 15 wherein the membrane is bi-folded and wherein the forming cone opens the bi-folded membrane without introducing internal stress to the membrane.

18. The method of claim 15 wherein a distance that outer edges of the bi-folded membrane travel are substantially equal to a distance that a center of the bi-folded membrane travels.

19. The method of claim 15 wherein irrigation tape is installed simultaneous to the membrane.

20. A method of deposing a membrane to a sub-surface level comprising:

providing a movable frame, at least one chisel attached to the frame, hydraulics to raise and lower the at least one chisel from the frame, and a membrane;

lowering the at least one chisel with the hydraulics to the sub-surface level;

moving the frame and at least one chisel forward;

deploying the membrane to the sub-surface level with the at least one chisel;

wherein the forming cone includes a ten-degree angle at a bottom front edge of the forming cone that engages the membrane at non-equal points.

\* \* \* \* \*